(12) United States Patent
Kakeda et al.

(10) Patent No.: US 7,282,535 B2
(45) Date of Patent: Oct. 16, 2007

(54) THERMOPLASTIC RESIN COMPOSITION

(75) Inventors: Yutaka Kakeda, Osaka (JP); Takeshi Chiba, Osaka (JP); Tomoki Hiiro, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/477,868

(22) PCT Filed: May 14, 2002

(86) PCT No.: PCT/JP02/04667

§ 371 (c)(1),
(2), (4) Date: Nov. 13, 2003

(87) PCT Pub. No.: WO02/092696

PCT Pub. Date: Nov. 21, 2002

(65) Prior Publication Data

US 2004/0147674 A1    Jul. 29, 2004

(30) Foreign Application Priority Data

May 14, 2001 (JP) .............................. 2001-143526
Sep. 28, 2001 (JP) .............................. 2001-303756

(51) Int. Cl.
*C08L 53/00* (2006.01)
*C08L 69/00* (2006.01)
*C08L 67/00* (2006.01)
*C08L 77/00* (2006.01)

(52) U.S. Cl. .................... 525/88; 525/92 B; 525/92 E; 525/92 F

(58) Field of Classification Search .............. 525/92 B, 525/92 E, 92 F, 88
See application file for complete search history.

(56) References Cited

U.S. PATENT DOCUMENTS 4,665,131 A * 5/1987 Moriya et al. ............... 525/277
5,399,620 A    3/1995 Niessner et al.

FOREIGN PATENT DOCUMENTS

| DE | 43 28 004 A1 | | 2/1995 |
|---|---|---|---|
| EP | 206644 A | | 12/1986 |
| EP | 0 545 184 A2 | | 6/1993 |
| JP | 63-110246 | * | 5/1988 |
| JP | 3-139510 A | | 6/1991 |
| JP | 7-258557 A | | 10/1995 |
| JP | 11-349782 A | | 12/1999 |
| JP | 11349782 | * | 12/1999 |
| JP | 2000-169665 A | | 6/2000 |
| JP | 2000-60449 A | | 2/2002 |
| JP | 2002-201244 A | | 7/2002 |

* cited by examiner

*Primary Examiner*—Ana Woodward
(74) *Attorney, Agent, or Firm*—Brinks Hofer Gilson & Lione

(57) ABSTRACT

A thermoplastic resin composition comprising a thermoplastic resin (a) and a block copolymer (b) containing a methacrylic polymer block (A) and an acrylic polymer block (B).

3 Claims, No Drawings

THERMOPLASTIC RESIN COMPOSITION

RELATED APPLICATIONS

This application is a nationalization of PCT Application No. PCT/JP02/04667 filed May 14, 2002. This application claims priority from Japanese Patent Application No. 2001-143526 filed on May 14, 2001 and Japanese Patent Application No. 2001-303756 filed on Sep. 28, 2001.

TECHNICAL FIELD

The present invention relates to a thermoplastic resin composition excellent in physical property balance, especially impact resistance. Moreover, the invention relates to a thermoplastic resin composition excellent in physical property balance, especially flexibility.

More specifically, the invention relates to a thermoplastic resin composition which comprises a thermoplastic resin and a block copolymer containing a methacrylic polymer and an acrylic polymer and which is excellent in physical property balance, especially impact resistance.

In addition, more specifically, the invention relates to a thermoplastic resin composition which comprises a crystalline thermoplastic resin and a block copolymer containing a methacrylic polymer and an acrylic polymer and which is excellent in flexibility and thermal deformation resistance.

BACKGROUND ART

Generally, thermoplastic resins are used in various fields, and methods of use in combination with other resins and the like are attempted when sufficient performance cannot be achieved by the uniform resin. Particularly, a polymer material having elastomer-like characteristics is used in combination therewith in most cases for improving impact resistance. The polymer material used for such purposes is referred to as an impact modifier.

There are proposed compositions obtained by combining, for example, a vinyl chloride resin with chlorinated polyethylene, an ethylene-vinyl acetate copolymer, a methyl methacrylate-butadiene-styrene copolymer (MBS resin), an acrylonitrile-butadiene-styrene copolymer (ABS resin), a butyl acrylate-methyl methacrylate copolymer or the like; a methacrylic resin with a butyl acrylate-styrene-methyl methacrylate copolymer or the like; a polycarbonate resin with an acrylonitrile-butadiene-styrene copolymer (ABS resin), a butyl acrylate-methyl methacrylate copolymer or the like; and a poly(butylene terephthalate) resin with an acrylonitrile-butadiene-styrene copolymer (ABS resin), an epoxy modified ethylene-propylene copolymer or the like. Many of these compositions are industrially utilized.

Among these impact modifiers, a methyl methacrylate-butadiene-styrene copolymer (MBS resin), an acrylonitrile-butadiene-styrene copolymer (ABS resin) and a butyl acrylate-methyl methacrylate copolymer are copolymers obtained by graft copolymerization of a vinyl monomer (forming a shell part) in the presence of cross-linked rubber particles (forming a core part), which are called a core-shell graft copolymer based on the particle structure and are useful as an impact modifier. Among these core-shell graft copolymers, MBS resin and ABS resin obtained by copolymerizing butadiene have a problem of weatherability because unsaturated double bonds remain in the main chain of the polymer. Therefore, a butyl acrylate-methyl methacrylate copolymer is selected very frequently when weatherability is required. It is pointed out, however, that these core-shell graft copolymers have problems of molding flowability because they contain a cross-linked structure though they are useful as an impact modifier.

On the other hand, it is known that a block copolymer obtained by combining a hard segment and a soft segment (rubber component) can be used as a composition by combining the copolymer with a thermoplastic resin. As the block copolymer, a styrene-butadiene copolymer, a styrene-isoprene copolymer and hydrogenated copolymers thereof (referred to as a styrene-ethylene-butylene copolymer and a styrene-ethylene-propylene copolymer, respectively) are widely used. Generally, when these block copolymers are used, a composition having excellent balance of impact resistance, rigidity and molding flowability can be obtained but thermoplastic resins are limited to low-polar resins such as polystyrene resins, polyolefin resins and poly(phenylene ether) resins.

Recently, it is known that a block copolymer containing a methacrylic polymer and an acrylic polymer functions as an excellent impact modifier, and a thermoplastic resin composition excellent in impact resistance can be obtained by combining it with a thermoplastic resin. As the thermoplastic resin to be combined in this case, a high-polar resin such as a poly(vinyl chloride) resin, a poly(methyl methacrylate) resin, a polycarbonate resin, a polyester resin, or a polyamide resin is effective. However, in the acrylic block copolymers, there has not yet been known a means to control physical property balance by introducing a point of reaction with a resin or the like and thus to improve the performance. Therefore, it has been strongly desired to develop the means.

Furthermore, recently, although the above-described block copolymer obtained by combining a hard segment and a soft segment has been used as a thermoplastic elastomer, there is a considerable restriction on an upper temperature limit in use.

Therefore, improvement of physical properties including oil resistance, control of physical property balance, and the like are sometimes required.

A block copolymer having a methacrylic polymer block and an acrylic polymer block is known to function as a thermoplastic elastomer, but there are similar problems. However, there has not yet been known a means to control physical property balance by compounding the copolymer with a specific resin or introducing a point of reaction with a resin or the like and thus to improve the performance. Therefore, it has been strongly desired to develop the means.

DISCLOSURE OF THE INVENTION

An object of the invention is to provide a thermoplastic resin composition excellent in physical property balance, especially impact resistance. Also, another object of the invention is to provide a thermoplastic resin composition excellent in physical property balance using a crystalline thermoplastic resin.

The present inventors have found that a block copolymer having a methacrylic polymer block and an acrylic polymer block functions as an excellent rubber component and forms a thermoplastic resin composition excellent in physical property balance in combination with a thermoplastic resin, and thus have accomplished the invention.

Namely, the invention has the following constitutions.

(1) A thermoplastic resin composition comprising a thermoplastic resin (a) and a block copolymer (b) containing a methacrylic polymer block (A) and an acrylic polymer block (B).

(2) The thermoplastic resin composition according to the above (1), wherein the thermoplastic resin (a) is a crystalline thermoplastic resin.

(3) The thermoplastic resin composition according to the above (2), wherein the thermoplastic resin (a) is a crystalline polyester resin or a crystalline polyamide resin.

(4) The thermoplastic resin composition according to the above (1), wherein the block copolymer (b) contains a reactive functional group (C) in at least one polymer block of the methacrylic polymer block (A) and the acrylic polymer block (B).

(5) The thermoplastic resin composition according to the above (4), wherein the thermoplastic resin (a) is a thermoplastic resin selected from the group consisting of poly(vinyl chloride) resins, poly(methyl methacrylate) resins, acrylonitrile-styrene copolymer resins, methyl methacrylate-styrene copolymer resins, polycarbonate resins, polyester resins, and polyamide resins.

(6) The thermoplastic resin composition according to the above (4), wherein the reactive functional group (C) is at least one functional group selected from the group consisting of an epoxy group, a hydrolyzable silyl group, a hydroxyl group, an amino group, a carboxyl group, an acid anhydride group, an alkenyl group, an active chlorine group, or an oxazoline group.

(7) The thermoplastic resin composition according to the above (1), comprising 99.5 to 10% by weight of thermoplastic resin (a) and 0.5 to 90% by weight of the block copolymer (b).

(8) The thermoplastic resin composition according to the above (2), comprising 90 to 10% by weight of thermoplastic resin (a) and 10 to 90% by weight of the block copolymer (b).

(9) The thermoplastic resin composition according to any one of the above (1) to (8), wherein the block copolymer (b) is produced by a controlled radical polymerization.

BEST MODE FOR CARRYING OUT THE INVENTION

The following will explain the present invention in detail.

<(a) Thermoplastic Resin>

Examples of the thermoplastic resin (a) useful in the present invention include poly(vinyl chloride)-based resins, polyethylene-based resins, polypropylene-based resins, cyclic olefin copolymer resins, poly(methyl methacrylate)-based resins, polystyrene-based resins; homopolymers or copolymers obtained by polymerizing 70 to 100% by weight of at least one vinyl monomer selected from the group consisting of aromatic alkenyl compounds, vinyl cyanide compounds and (meth)acrylate esters, with 0 to 30% by weight of another vinyl monomer copolymerizable with the vinyl monomer, such as ethylene, propylene or vinyl acetate, and/or a diene monomer such as butadiene or isoprene; polyphenylene ether-based resins, polycarbonate-based resins, polyester-based resins, polyamide-based resins, polyacetal resins, polyphenylene sulfide resins, polysulfone resins, polyimide resins, polyether imide resins, polyether ketone resins, polyetherether ketone resins, and polyamideimide resins, and the like. These can be used alone or in combination of two or more.

Examples of the poly(vinyl chloride)-based resins include poly(vinyl chloride) homopolymers having various degrees of polymerization and poly(vinyl chloride) copolymers such as vinyl chloride-vinyl acetate copolymers, vinyl chloride-vinyl acetate-maleic anhydride copolymers, vinyl chloride-ethylene copolymers, and vinyl chloride-propylene copolymers; poly(vinyl chloride) alloys such as alloys of poly(vinyl chloride) and ethylene-vinyl acetate copolymers, alloys of poly(vinyl chloride) and acrylonitrile-butadiene-styrene copolymers, alloys of poly(vinyl chloride) and methyl methacrylate-butadiene-styrene copolymers, alloys of poly(vinyl chloride) and chlorinated polyethylene, alloys of poly(vinyl chloride) and acrylic copolymers, alloys of poly(vinyl chloride) and polyurethanes, alloys of poly(vinyl chloride) and NBR; poly(vinyl chloride)/filler composites, functional poly(vinyl chloride)s such as post-chlorinated poly(vinyl chloride), poly(vinylidene chloride) homopolymers, poly(vinylidene chloride) copolymers such as vinylidene chloride-vinyl chloride copolymers, vinylidene chloride-acrylonitrile copolymers, and vinylidene chloride-acrylate ester copolymers, and the like. Any of the poly(vinyl chloride)-based resins can be suitably used form the viewpoint of compatibility.

Examples of the polyethylene-based resins include polyethylene resins such as low density polyethylene, high density polyethylene, linear low density polyethylene, and ultrahigh molecular weight polyethylene; and copolymers of ethylene and a polar monomer, such as ethylene-vinyl acetate copolymers, ethylene-methyl acrylate copolymers, ethylene-ethyl acrylate copolymers, ethylene-methyl methacrylate copolymers, ethylene-methyl acrylate-glycidyl methacrylate copolymers, ethylene-vinyl acetate-glycidyl methacrylate copolymers, ethylene-acrylic acid copolymers, copolymers of ethylene and metal salts of acrylic acid or methacrylic acid, maleic anhydride-modified polyethylene, maleic anhydride-modified ethylene-ethyl acrylate copolymers, ethylene-dimethylaminomethyl methacrylate copolymers, ethylene-vinyl alcohol copolymers, and ethylene oxide adducts of ethylene-vinyl alcohol copolymers. Of these, copolymers of ethylene and a polar monomer are preferable form the viewpoint of compatibility, and copolymers having a glycidyl group, a carboxyl group, or an alcoholic hydroxyl group are preferable form the viewpoint of compatibility.

Examples of the polypropylene-based resins include polypropylenes such as homoisotactic polypropylene, isotactic polypropylene random copolymers containing ethylene or 1-butene, isotactic polypropylene block copolymers containing ethylenepropylene, Ziegler-Natta catalyst-based isotactic polypropylene, metallocene catalyst-based isotactic polypropylene, metallocene catalyst-based syndiotactic polypropylene, and atactic polypropylene; functional polypropylenes such as polymer alloys of polypropylene and a rubber, polypropylene/filler composites, chlorinated polypropylene, and maleic acid-modified polypropylene. Of these, chlorinated polypropylene and maleic acid-modified polypropylene are preferable form the viewpoint of compatibility.

The cyclic olefin copolymer resins are not particularly limited as far as they contains a cyclic olefin, such as cyclopentadiene or dicyclopentadiene and may be, for example, ARTON (manufactured by JSR Co. Ltd.), ZEONEX (manufactured by Nippon Zeon Co. Ltd.), or copolymers of a cyclic olefin and ethylene or propylene. Of these, ARTON is preferable form the viewpoint of compatibility.

The poly(methyl methacrylate)-based resins are not particularly limited as far as they are resins containing methyl methacrylate as the main component, and may be poly(methyl methacrylate) resins in which α-methylstyrene, maleic anhydride, or the like is copolymerized. Since poly(methyl methacrylate)-based resins have ester groups in the side chains, any of them can be suitably used form the viewpoints of compatibility and/or reactivity.

Examples of the polystyrene-based resins include polystyrene homopolymer, polystyrene-polybutadiene polymer alloys, impact resistant polystyrene such as polystyrene-acrylic rubber polymer alloys, syndiotactic polystyrene, and the like.

As the homopolymers or copolymers obtained by polymerizing 70 to 100% by weight of at least one vinyl monomer selected from the group consisting of aromatic alkenyl compounds, vinyl cyanide compounds and (meth) acrylate esters, with 0 to 30% by weight of another vinyl monomer copolymerizable with the vinyl monomer, such as ethylene, propylene or vinyl acetate, and/or a diene monomer such as butadiene or isoprene, there are, for example, mentioned acrylonitrile-styrene-based copolymer resins such as acrylonitrile-styrene copolymer resins, acrylonitrile-butadiene-styrene copolymer resins, acrylonitrile-butadiene-styrene-α-methylstyrene copolymer resins, maleimide-modified acrylonitrile-butadiene-styrene copolymer resins, acrylonitrile-butyl acrylate-styrene copolymer resins, acrylonitrile-ethylene/propylene-styrene copolymer resins, and acrylonitrile-chlorinated polyethylene-styrene copolymer resins; methyl methacrylate-styrene copolymer resins; and the like. Any of the acrylonitrile-styrene(-based) copolymer resins and methyl methacrylate-styrene copolymer resins are suitably used form the viewpoints of compatibility/reactivity.

As the polyphenylene ether-based resins, there are mentioned polyphenylene ether homopolymers; polyphenylene ether-based alloys such as alloys of polyphenylene ether and polystyrene, alloys of polyphenylene ether and a polyamide, and alloys of polyphenylene ether and poly(butylene terephthalate).

As the polycarbonate-based resins, there are mentioned polycarbonates such as bisphenol A-type aromatic polycarbonates; polycarbonate-based alloys such as alloys of polycarbonates and acrylonitrile-butadiene-styrene copolymers, alloys of polycarbonates and polybutylene terephthalate, alloys of polycarbonates and polyarylates, and alloys polycarbonates and poly(methyl methacrylate). Since polycarbonate-based resins are excellent in compatibility with the block copolymer (b) and also the carbonate bond in the main chain, terminal carboxyl group, and hydroxyl group have reactivity, any of them can be suitably used.

Examples of the polyester-based resins include aliphatic polyesters such as poly(glycolic acid), poly(lactic acid), polycaprolactone, and poly(ethylene succinate); semi-aromatic polyesters such as polyethylene terephthalate, polytrimethylene terephthalate, polybutylene terephthalate, polyethylene naphthalate, polycyclohexanedimethylene terephthalate, ethylene terephthalate/cyclohexanedimethylene terephthalate, thermotropic liquid crystal polymer 1 type, and thermotropic liquid crystal polymer 2 type. In addition, ester-based elastomers which are block copolymer having a polyester segment are also mentioned. Since polyester-based resins are excellent in compatibility with the block copolymer (b) and also the ester bond in the main chain, terminal carboxyl group and hydroxyl group have reactivity, any of them can be suitably used.

Examples of the polyamide-based resins include ring-opening polymerization-based aliphatic polyamides such as PA6 (polycaproamide) and PA12 (polydodecanamide); polycondensation-based polyamides such as PA66 (polyhexamethylene adipamide), PA46 (polytetramethylene adipamide), PA610, PA612, and PA11; semi-aromatic polyamides such as MXD6, PA6T, PA9T, PA6T/66, PA6T/6, and amorphous PA; all-aromatic polyamides such as poly(p-phenylene terephthalamide), poly(m-phenylene terephthalamide), and poly(m-phenylene isophthalamide); and the like. Also, there are mentioned amide-based elastomers which are block copolymers having a polyamide segment. Since polyamide-based resins are excellent in compatibility with the block copolymer (b) and also the amide bond in the main chain, terminal carboxyl group and hydroxyl group have reactivity, any of them can be suitably used.

Examples of the polyacetal resins include polyacetal homopolymers and copolymers of formaldehyde and trioxane.

Since the polyphenylene sulfide resins, polysulfone resins, polyimide resins, polyetherimide resins, polyetherketone resins, polyetheretherketone resins, and polyamideimide resins are excellent in compatibility with the block copolymer (b) and also reactive groups are present in the main chain and at the end, any of them can be suitably used.

In the invention, the thermoplastic resin (a) is not limited thereto, and various thermoplastic resins can be widely used. Of these, those having good compatibility and/or good reactivity with the block copolymer (b) are preferable from the viewpoint that desired physical properties are easily obtained. Moreover, even a resin having not so good compatibility with the block copolymer (b) and exhibiting no reactivity with the block copolymer (b) can be also used in the invention, but a composition having more preferable physical properties can be obtained by a known method, for example, a method of chemically modifying the resin by treating with a silane coupling agent, an organic acid anhydride, or the like or a method of using a compatibility enhancer. Furthermore, even when the resin has no site reactive with the block copolymer (b), the chemical stability and thermal resistance of the block copolymer (b) can be improved by crosslinking the block copolymer (b) dispersed in the resin, and further the dispersion diameter can be controlled by crosslinking it during its kneading process with the resin.

In the case that two or more above thermoplastic resins are used in combination, the combinations are not particularly limited. When the combinations are exemplified using a resin group (a1) having a good compatibility and reactivity with the block copolymer (b), a resin group (a2) having a good compatibility but no reactivity with the block copolymer (b), a resin group (a3) having no good compatibility but reactivity with the block copolymer (b), and a resin group (a4) having no good compatibility and no reactivity with the block copolymer (b) as examples, preferred are combinations of (a1) and (a1), (a1) and (a2), (a1) and (a3), (a1) and (a4), (a2) and (a2), (a2) and (a3), (a2) and (a4), (a3) and (a3), and (a3) and (a4). Specific examples of the combinations in the case that the reactive functional group (C) is an epoxy group include PC/PBT and PET/PBT as the combination of (a1) and (a1), PC/ABS as the combination of (a1) and (a2), and PVC/ABS as the combination of (a2) and (a2). Moreover, for the purpose of improving compatibility between the resins to be combined, it is also possible to use the block copolymer (b) as the compatibility enhancer.

Among the above thermoplastic resins, it is preferable to use at least one of poly(vinyl chloride) resins, poly(methyl methacrylate) resins, acrylonitrile-styrene copolymer resins, methyl methacrylate-styrene copolymer resins, polycarbonate-based resins, polyester-based resins and polyamide-based resins, since they have good compatibility and/or reactivity with the block copolymer (b) used in the invention and excellent physical properties, especially impact resistance can be easily achieved. Moreover, they can be used in combination of two or more, and the combinations are not particularly limited.

Furthermore, the thermoplastic resin (a) is preferably a crystalline thermoplastic resin.

In the above thermoplastic resin composition, the crystalline thermoplastic resin is preferably a thermoplastic resin selected from the group consisting of crystalline polyester resins and crystalline polyamide resins. These can be used alone or in combination of two or more.

Examples of the crystalline polyester-based resins include aliphatic polyesters such as poly(glycolic acid), poly(lactic acid), polycaprolactone, and poly(ethylene succinate); semi-aromatic polyesters such as polyethylene terephthalate, polytrimethylene terephthalate, polybutylene terephthalate, polyethylene naphthalate, polybutylene naphthalate, and polycyclohexanedimethylene terephthalate, ester-based elastomers; and the like. Of these, polybutylne terephthalate is preferable from the viewpoints of crystallization speed and physical property balance.

Examples of the crystalline polyamide-based resins include ring-opening polymerization-based aliphatic polyamides such as PA6 (polycaproamide) and PA12 (polydodecanamide); polycondensation-based polyamides such as PA66 (polyhexamethylene adipamide), PA46 (polytetramethylene adipamide), PA610, PA612, and PA11; semi-aromatic polyamides such as PA6T/66, amide-based elastomers; and the like. Of these, PA6 is preferable from the viewpoints of physical property balance and cost.

In the case that the crystalline thermoplastic resin and the block copolymer (b) are blended, the composition ratio thereof is not particularly limited but is preferably 90 to 10% by weight of the crystalline thermoplastic resin and 10 to 90% by weight of the block copolymer (b), more preferably 80 to 20% by weight of the crystalline thermoplastic resin and 20 to 80% by weight of the block copolymer (b), further preferably 70 to 30% by weight of the crystalline thermoplastic resin and 30 to 70% by weight of the block copolymer (b) from the viewpoint of better balance between flexibility and thermal resistance.

In the case that flexibility is emphasized, the ratio is preferably 90 to 10% by weight of the crystalline thermoplastic resin and 10 to 90% by weight of the block copolymer (b), more preferably 70 to 10% by weight of the crystalline thermoplastic resin and 30 to 90% by weight of the block copolymer (b), further preferably 50 to 10% by weight of the crystalline thermoplastic resin and 50 to 90% by weight of the block copolymer (b).

When the blending amount of the block copolymer (b) is less than 10% by weight, there is a tendency that a composition having the desired physical properties is difficult to obtain. When it exceeds 90% by weight, it tends to be difficult to express the characteristic physical properties inherent to the crystalline thermoplastic resin.

<Block Copolymer (b)>

The structure of the above block copolymer (b) is not particularly limited but is preferably a linear block copolymer (b1) or a branched (star-shaped) block copolymer (b2).

The linear block copolymer (b1) may have any structure but preferably contains a di-block copolymer, a tri-block copolymer, or both of them, and further preferably contains these block copolymers as main components. The structure of the block copolymer other than the di-block copolymer and tri-block copolymer may be, for example, a multi-block copolymer. As examples of the structure of the block copolymer of the invention, a di-block copolymer, a tri-block copolymer, a mixture of a triblock copolymer and a di-block copolymer, a mixture of tri-block copolymer and a multi-block copolymer, or a mixture of di-block copolymer, a tri-block copolymer and a multi-block copolymer is more preferable. Of these, it is further preferable to contain a di-block copolymer and a tri-block copolymer as main components.

In these case, when a methacrylic polymer block is expressed as A and an acrylic polymer block as B, the di-block copolymer is an A-B type, the tri-block copolymer is an A-B-A type or a B-A-B type, and the multi-block copolymer is an A-(B-A)$_n$-B type, an A-B-(A-B)$_n$-A type, or a B-(A-B)$_n$-A-B type where n is an integer of 1 or more. Of these, the tri-block type is preferably the A-B-A type and the multi-block type is preferably the A-(B-A)$_n$-B type or the A-B-(A-B)$_n$-A type from the viewpoint of cohesive force.

The branched (star-shaped) block copolymer (b2) may has any structure but is a block copolymer having the above linear block copolymers as basic units from the viewpoint of physical properties of the composition.

The structures of such block copolymers are suitably used depending on intended uses. Moreover, even when these block copolymers contain homo-poly(acrylate ester), homo-poly(methacrylate ester), and the like formed during the production process are also included in the claimed scope of the invention.

The block copolymer (b) usable in the invention contains a methacrylic polymer block (A) and an acrylic polymer block (B), but may contain a reactive functional group (C) in at least one of the polymer blocks.

The reactive functional group (C) is preferably at least one functional group selected from the group consisting of an epoxy group, a hydrolyzable silyl group, a hydroxyl group, an amino group, a carboxyl group, an acid anhydride group, an alkenyl group, an active chlorine group, or an oxazoline group, from the viewpoints of the stability of the bond formed by the reaction, reaction mode, easiness of the reaction, availability of starting materials, cost and the like. An epoxy group is highly reactive and reacts with various functional groups, and a hydrolyzable silyl group reacts with moisture in the air to cause crosslinking, which are characteristic features that the other reactive functional groups do not have. In addition, a hydroxyl group is useful from the viewpoints of easiness of introduction and cost. Also, a carboxyl group is useful since it has a high polarity and reacts with an amino group and a hydroxyl group, and furthermore an acid anhydride group is useful since it has a high reactivity and reacts with various functional groups. Depending on the purposes, the reactive functional group can be introduced into the block copolymer in the form protected with a suitable protective group or in the form of a functional group which is a precursor of the reactive functional group, and thereafter the reactive functional group can be formed by a known chemical reaction.

Two or more of these reactive functional groups can be used in combination. In the case that two or more of the reactive functional groups is used in combination, there may be mentioned, for example, the case that reactive functional groups which do not react with each other are selected because the reaction modes thereof are different, the case that reactive functional groups which react with each other like an acid and a base are selected, the case that reactive functional groups whose reaction modes are the same but whose reactivity and reaction conditions are different from each-other are selected, and the like cases, and they can be suitably used depending on intended purposes. Depending on the purposes, one reactive functional group alone or all the reactive functional groups may be introduced into the acrylic block copolymer in the form protected with a suitable protective group or in the form of a functional group which is a precursor, and thereafter the reactive functional group can be formed by a known chemical reaction.

The preferable range of the number of the reactive functional group (C) to be contained varies depending on the reactivity and reaction mode of the reactive functional group (C), the structure and composition of the block copolymer (b), the number of blocks which constitutes the block copolymer (b), and the site and mode where the reactive functional group is contained.

In the case that the physical property balance of the composition is emphasized, the preferable range of the number of (C) to be contained is preferably 0.1 or more, more preferably 0.2 or more, further preferably 0.5 or more per molecule of the block copolymer. In the case that impact resistance among the physical properties is especially emphasized, the range is preferably 1.0 or more, more preferably 2.0 or more per molecule of the block copolymer. The upper limit of the number to be contained is not particularly defined but can be set depending on characteristic properties of the resulting composition. In the following description, in the case that the number of the reactive functional group to be contained is numerically less than 1.0 per molecule of the block copolymer, it should be understood that the composition is a mixture of a block copolymer having 1.0 or more of the reactive functional group per molecule of the block copolymer and a block copolymer having no reactive functional group.

The site where the reactive functional group (C) is contained is not particularly limited but may be contained in both or any of the methacrylic polymer block (A) and the acrylic polymer block (B), between polymer blocks, and at the end of the molecular chain.

The mode where (C) is contained is not particularly limited but may be derived from a monomer and may be bonded to the end of the molecular chain directly or through a suitable organic group. In the case that (C) is derived from a monomer, the number of repeating units composed of the monomer may be 1 or 2 or more per polymer block where the monomer is contained. When the number is 2 or more, the mode of polymerization of the monomer may be random copolymerization or block copolymerization. In the case of a A-B type di-block copolymer as an example, the copolymer may be any of an (A/C)-B type, an A-(B/C) type, a C-A-B type, an A-B-C type, and the like. In the case of a A-B-A type tri-block copolymer as an example, the copolymer may be any of an (A/C)-B-A type, an (A/C)-B-(A/C) type, an A-(B/C)-A type, a C-A-B-A type, a C-A-B-A-C type, and the like. In these cases, (A/C) means that the functional group (C) is contained in the block A.

In the case that two or more reactive functional groups (C) are used in combination, the site and mode of each group to be contained may be freely set. Moreover, there may be mentioned the case that the individual reactive functional groups are contained in the same polymer block, the case that the individual groups are contained in different polymer blocks, or the like cases, and the cases can be suitably used depending on intended uses.

The number average molecular weight of the block copolymer (b) is not particularly limited, and may be determined based on the molecular weight to be required for each of the block (A) and the block (B). In the case that modification of impact resistance is mainly aimed, the range of the number average molecular weight of (b) is preferably 30,000 to 500,000, more preferably 40,000 to 400,000. Moreover, in the case that modification of processability is mainly aimed, the range is preferably 10,000 to 1,000,000, more preferably 30,000 to 400,000. Furthermore, in the case that it is aimed to obtain a compound material having a modulus of elasticity between the values of a resin and an elastomer, the range is preferably 10,000 to 500,000, more preferably 30,000 to 400,000, further preferably 50,000 to 300,000. In these cases, it is determined depending on the physical property balance required, since a small number average molecular weight tends to cause decrease of physical properties and large number average molecular weight tends to cause decrease of processability.

The ratio (Mw/Mn) of weight average molecular weight (Mw) to number average molecular weight (Mn) measured by gel permeation chromatography is not particularly limited, and is preferably 1.8 or less, more preferably at 1.5 or less. When Mw/Mn exceeds 1.8, uniformity of the block copolymer tends to decrease.

The composition ratio of the methacrylic polymer block (A) and the acrylic polymer block (B) which constitute the block copolymer (b) is not particularly limited and may be determined depending on the physical properties required in intended uses, moldability required at processing of the composition, and molecular weight required for each of the block A and the block B.

The composition ratio of the methacrylic polymer block (A) and the acrylic polymer block (B) is preferably 5 to 90% by weight of the block (A) and 95 to 10% by weight of the block (B), more preferably 10 to 80% by weight of (A) and 90 to 20% by weight of (B), and further preferably 20 to 50% by weight of (A) and 80 to 50% by weight of (B). When (A) is less than 5% by weight, the compatibility with the thermoplastic resin tends to decrease and hence to result in defect in appearance and decrease of weld properties. When (B) is less than 10% by weight, impact resistance of the thermoplastic resin composition tends to decrease.

Moreover, in the case that modification of processability is mainly aimed, the ratio is preferably 5 to 95% by weight of the block (A) and 95 to 5% by weight of the block (B), more preferably 10 to 90% by weight of (A) and 90 to 10% by weight of (B), and further preferably 20 to 80% by weight of (A) and 80 to 20% by weight of (B). In the case that modification of processability is aimed, the composition range to be applied is generally larger than the case that modification of impact resistance is aimed, since the amount of the block copolymer to be added is small. When the ratio of (A) is less than 5% by weight, compatibility with the thermoplastic resin tends to decrease and hence to result in defect in appearance and decrease of weld properties. When the ratio of (B) is less than 5% by weight, modification effect on the processability of the thermoplastic resin composition tends to decrease.

Furthermore, in the case that it is aimed to obtain a compound material having a modulus of elasticity between that of a resin and that of an elastomer, the ratio is preferably 5 to 90% by weight of the block (A) and 95 to 10% by weight of the block (B), more preferably 10 to 80% by weight of (A) and 90 to 20% by weight of (B), and further preferably 20 to 60% by weight of (A) and 80 to 40% by weight of (B). When the ratio of (A) is less than 5% by weight, compatibility with the thermoplastic resin tends to decrease and hence to result in defect in appearance and decrease of weld properties. When the ratio of (B) is less than 10% by weight, physical property balance of the thermoplastic resin composition tends to decrease.

The relationship between glass transition temperatures of the block (A) and the block (B) which constitute the block copolymer preferably satisfies the following equation, wherein the glass transition temperatures of the block (A) is represented by TgA and that of the block (B) by TgB.

$$TgA > TgB$$

The above glass transition temperature (Tg) of the copolymer can be roughly set by setting the weight ratio of the monomer in each polymer part according to the following Fox equation.

$$1/Tg = (W_1/Tg_1) + (W_2/Tg_2) + \ldots + (W_m/Tg_m)$$
$$W_1 + W_2 + \ldots + W_m = 1$$

In the equation, Tg represents glass transition temperature of the polymer part, $Tg_1$, $Tg_2$, ..., and $Tg_m$ each represents glass transition temperature of each polymerized monomer, and $W_1$, $W_2$, ..., $W_m$ each represents weight ratio of each polymerized monomer.

As the glass transition temperature of each polymerized monomer in the above Fox equation, the value described in Polymer Handbook Third Edition (Wiley-Interscience, 1989) may be suitably used, for example. In this regard, the above glass transition temperature can be measured by DSC (differential scanning calorimetry) or tan δ peak of dynamic viscoelasticity, but when the polarity of the block (A) is too close to that of the block (B) or the number of the monomer in the block is too small, the measured value may sometimes deviate from the calculation according to the above Fox equation.

Moreover, in order to impart transparency to the thermoplastic resin composition, there may be mentioned a method of matching the refraction index of the thermoplastic resin to that of the block copolymer, a method of lowering the dispersion diameter of the block copolymer (b) to not more than a certain value, and a method of combining both methods.

In the case of matching the refraction index of the thermoplastic resin to that of the block copolymer, the range of difference between $n_a$ and $n_b$ is preferably 0.1 or less, more preferably 0.05 or less, further preferably 0.02 or less, most preferably 0.01 or less, wherein the refraction index of the thermoplastic resin is represented by $n_a$ and that of the block copolymer $n_b$. Moreover, in the case of lowering the dispersion diameter of the block copolymer (b) to not more than a certain value, the range of the dispersion diameter of (b) at TEM observation of ultra-thin slice of a molded article treated with an appropriate staining agent is preferably 800 nm or less, more preferably 400 nm or less, further preferably 200 nm or less, most preferably 100 nm or less. Furthermore, in the case of combining both methods, a synergistic effect can be obtained with regard to transparency.

As the refraction index of the above resin (a) or block copolymer (b), the value described in Polymer Handbook Third Edition (Wiley-Interscience, 1989) or the value measured using sodium D-line on a refractometer may be used, for example.

<Methacrylic Polymer Block (A)>

The monomer which constitutes the block (A) comprises a methacrylate ester as a main component since a block copolymer having desired physical properties can be easily obtained and it is advantageous in view of cost and easy availability. The word "main component" means that the component is contained in an amount of 50% by weight or more, preferably 75% by weight or more. Namely, the block (A) comprises 50 to 100% by weight, preferably 75 to 100% by weight of methacrylate ester and 0 to 50% by weight, preferably 0 to 25% by weight of a vinyl monomer copolymerizable therewith. In the case that the reactive functional group (C) is derived from a monomer and the monomer is contained in the methacrylic polymer block (A), the monomer may be any of the methacrylate ester and the vinyl monomer copolymerizable therewith but should satisfy the above composition. When the ratio of the methacrylate ester is too small, the weatherability, high glass transition temperature and compatibility with the thermoplastic resin inherent to the methacrylate ester tend to be lost.

Molecular weight required for the block (A) may be determined based on cohesive force required for the block (A), period of time required for the polymerization, and further the dispersion diameter of the block copolymer (b) to the thermoplastic resin (a).

Cohesive force is considered to be dependent on the degree of interaction (in other word, polarity) and intertwining between molecules. Thus, intertwining points increase as the molecular weight increases and hence cohesive force is enhanced. Namely, in the case that cohesive force is required, it is preferable that $M_A$ is larger than $Mc_A$, wherein molecular weight required for the block (A) is represented by $M_A$ and molecular weight between the intertwining points of the polymer which constitutes the block (A) is represented by $Mc_A$. Furthermore, in the case that more cohesive force is required, $M_A \times 2*Mc_A$ is preferable. Contrarily, in the case that both of a certain cohesive force and creep property are desired, it is preferable to be $Mc_A < M_A < 2 \times Mc_A$. The molecular weight between the intertwining points may be understood by referring to the literature of Wu et al. (Polym. Eng. and Sci., Vol. 30, pp. 753 (1990)) or the like. For example, when all the block (A) is assumed to be constituted by methyl methacrylate, the range of number average molecular weight of the block (A) is preferably 9200 or more in the case that cohesive force is required. However, since period of time required for polymerization tends to increase in the case of large number average molecular weight, the molecular weight may be determined according to the required productivity, and is preferably 200,000 or lower, further preferably 100,000 or lower.

Although the detail on the dispersion diameter will be described later, in order to obtain a desired dispersion diameter, molecular weight required for the block (A) may be designed so as to attain an appropriate viscosity of the block copolymer (b) at processing together with further consideration of compatibility of the block (A) with the resin (in other word, relation of polarity) and the amount and site of the reactive functional group (C).

Examples of the methacrylate ester which constitutes the block (A) include aliphatic hydrocarbon (e.g., alkyl) esters of methacrylic acid, such as methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate and stearyl methacrylate; alicyclic hydrocarbon esters of methacrylic acid, such as cyclohexyl methacrylate and isobornyl methacrylate; aralkyl esters of methacrylic acid, such as benzyl methacrylate; aromatic hydrocarbon esters of methacrylic acid, such as phenyl methacrylate and toluyl methacrylate; esters of methacrylic acid with a functional group-containing alcohol having an ethereal oxygen, such as 2-methoxyethyl methacrylate and 3-methoxybutyl methacrylate; fluorinated alkyl esters of methacrylic acid, such as trifluoromethylmethyl methacrylate, 2-trifluoromethylethyl methacrylate, 2-perfluoroethylethyl methacrylate, 2-perfluoroethyl-2-perfulorobutylethyl methacrylate, 2-perfluoroethyl methacrylate, perfluoromethyl methacrylate, diperfluoromethylmethyl methacrylate, 2-perfluoromethyl-2-perfuloroetylmethyl methacrylate, 2-perfluorohexylethyl methacrylate, 2-perfluorodecylethyl methacrylate, and 2-perfluorohexadecylethyl methacrylate, and the like.

These can be used alone or in combination of two or more. Of these, methyl methacrylate is preferable from the viewpoints of compatibility with thermoplastic resins to be combined, cost, and easy availability. In the case that a carboxyl group or an acid anhydride group is intended to be introduced using the conversion reaction which will be mentioned later, tert-butyl methacrylate is preferable. Moreover, the glass transition temperature can be elevated by copolymerization with isobornyl methacrylate, cyclohexyl methacrylate, or the like.

Examples of the vinyl monomer copolymerizable with the methacrylate ester which constitutes the block (A) include an acrylate ester, a mathacrylate ester, an aromatic alkenyl compound, a vinyl cyanide compound, a conjugated diene compound, a halogen-containing unsaturated compound, an unsaturated dicarboxylic acid compound, a vinyl ester compound, a maleimide compound, and the like.

Examples of the acrylate ester include aliphatic hydrocarbon (e.g., alkyl) esters of acrylic acid, such as methyl acrylate, ethyl acrylate, n-propyl acrylate, isopropyl acrylate, n-butyl acrylate, isobutyl acrylate, t-butyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate and stearyl acrylate; alicyclic hydrocarbon esters of acrylic acid, such as cyclohexyl acrylate and isobornyl acrylate; aromatic hydrocarbon esters of acrylic acid, such as phenyl acrylate and toluyl acrylate; aralkyl esters of acrylic acid, such as benzyl acrylate; esters of acrylic acid with a functional group-containing alcohol having an ethereal oxygen, such as 2-methoxyethyl acrylate and 3-methoxybutyl acrylate; fluorinated alkyl esters of acrylic acid, such as trifluoromethylmethyl acrylate, 2-trifluoromethylethyl acrylate, 2-perfluoroethylethyl acrylate, 2-perfluoroethyl-2-perfulorobutylethyl acrylate, 2-perfluoroethyl acrylate, perfluoromethyl acrylate, diperfluoromethylmethyl acrylate, 2-perfluoromethyl-2-perfuloroetylmethyl acrylate, 2-perfluorohexylethyl acrylate, 2-perfluorodecylethyl acrylate, and 2-perfluorohexadecylethyl acrylate, and the like.

Examples of the aromatic alkenyl compound include styrene, α-methyl styrene, p-methyl styrene, p-methoxyl styrene, and the like.

Examples of the vinyl cyanide compound include acrylonitrile, methacrylonitrile, and the like.

Examples of the conjugated diene compound include butadiene, isoprene, and the like.

Examples of the halogen-containing unsaturated compound include vinyl chloride, vinylidene chloride, perfluoroethylene, perfluoropropylene, vinylidene fluoride, and the like.

Examples of the unsaturated dicarboxylic acid compound include maleic anhydride, maleic acid, monoalkyl esters and dialkyl esters of maleic acid, fumaric acid, monoalkyl esters and dialkyl esters of fumaric acid, and the like.

Examples of the vinyl ester compound include vinyl acetate, vinyl propionate, vinyl pivalate, vinyl beozoate, vinyl cinnamate, and the like.

Examples of the maleimide compound include maleimide, methylmaleimide, ethylmaleimide, propylmaleimide, butylmaleimide, hexylmaleimide, octylmaleimide, dodecylmaleimide, stearylmaleimide, phehylmaleimide, cyclohexylmaleimide, and the like.

These are used alone or in combination of two or more. A preferable vinyl monomer can be selected out of these according to its compatibility with the thermoplastic resins to be combined. In order to impart some property to the block copolymer, a preferable one can be selected. For example, for the purpose of enhancing thermal resistance of the block copolymer, a monomer resulting Tg higher than that of the polymer of the methacrylate ester can be copolymerized. Moreover, the polymer of methyl methacrylate is depolymerized almost quantitatively by thermal decomposition, but in order to inhibit it, an acrylate ester such as methyl acrylate, ethyl acrylate, butyl acrylate, 2-methoxyethyl acrylate or a mixture thereof, or methacrylic acid, methacrylic anhydride or styrene can be copolymerized. Furthermore, for the purpose of improving oil resistance, acrylonitrile can be copolymerized. In addition, in order to enhance cohesive force, a monomer having a different molecular weight between intertwining points or polarity can be copolymerized.

The glass transition temperature of the block (A) is preferably 25° C. or higher, more preferably 40° C. or higher, further preferably 50° C. or higher. When the glass transition temperature is lower than 25° C., impact resistance and thermal stability, such as HDT, of the thermoplastic resin are sometimes insufficient.

The glass transition temperature (Tg) of the above polymer block (A) can be set by setting the weight ratio of the monomer in each polymer part according to the above Fox equation. The glass transition temperature is calculated according to the Fox equation using the value described in Polymer Handbook Third Edition (Wiley-Interscience, 1989) as the glass transition temperature of each polymerized monomer.

<Acrylic Polymer Block (B)>

The monomer constituting the block (B) comprises an acrylate ester as a main component since a composition having desired physical properties can be easily obtained and it is advantageous in view of cost and easy availability. Namely, the block (B) comprises 50 to 100% by weight, preferably 75 to 100% by weight of an acrylate ester and 0 to 50% by weight, preferably 0 to 25% by weight of a vinyl monomer copolymerizable therewith. In the case that the reactive functional group (C) is derived from a monomer and the monomer is contained in the acrylic polymer block (B), the monomer may be any of the acrylate ester and the vinyl monomer copolymerizable therewith but should satisfy the above composition.

When the ratio of the acrylate ester is too small, the physical properties, especially impact resistance or flexibility inherent to the use of the acrylate ester tend to be lost.

Molecular weight required for the block (B) may be determined based on modulus of elasticity and rubber elasticity required for the block (B), period of time required for the polymerization, and dispersion diameter of the block copolymer (b) to the thermoplastic resin (a).

Modulus of elasticity closely relates to mobility of a molecular chain (in other word, glass transition temperature) and molecular weight thereof and thus an intrinsic modulus of elasticity cannot be exhibited unless the molecular weight is not smaller than a certain value. The same shall apply to rubber elasticity but a larger molecular weight is desirable from the viewpoint of rubber elasticity. Namely, the range of molecular weight required for the block (B) is preferably $M_B$>3000, more preferably $M_B$>5000, further preferably $M_B$>10000, particularly preferably $M_B$>20000, and most preferably $M_B$>40000, wherein the molecular weight required for the block (B) is represented by $M_B$. However, since period of time required for polymerization tends to increase in the case of a large number average molecular weight, the molecular weight may be determined according to the required productivity, and is preferably 500,000 or lower, further preferably 300,000 or lower.

Although the detail on the dispersion diameter will be described later, in order to obtain a desired dispersion diameter, molecular weight required for the block (A) may be designed so as to attain an appropriate viscosity of the block copolymer (b) at processing together with further consideration of compatibility of the block (B) with the resin (in other word, relation of polarity) and the amount and site of the reactive functional group (C).

Examples of the acrylate ester which constitutes the block (B) include aliphatic hydrocarbon (e.g., alkyl) esters of acrylic acid, such as methyl acrylate, ethyl acrylate, n-propyl acrylate, isopropyl acrylate, n-butyl acrylate, isobutyl acrylate, t-butyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate and stearyl acrylate; alicyclic hydrocarbon esters of acrylic acid, such as cyclohexyl acrylate and isobornyl acrylate; aromatic hydrocarbon esters of acrylic acid, such as phenyl acrylate and toluyl acrylate; aralkyl esters of acrylic acid, such as benzyl acrylate; esters of acrylic acid with a functional group-containing alcohol having an ethereal oxygen, such as 2-methoxyethyl acrylate and 3-methoxybutyl acrylate; fluorinated alkyl esters of acrylic acid, such as trifluoromethylmethyl acrylate, 2-trifluoromethylethyl acrylate, 2-perfluoroethylethyl acrylate, 2-perfluoroethyl-2-perfulorobutylethyl acrylate, 2-perfluoroethyl acrylate, perfluoromethyl acrylate, diperfluoromethylmethyl acrylate, 2-perfluoromethyl-2-perfuloroetylmethyl acrylate, 2-perfluorohexylethyl acrylate, 2-perfluorodecylethyl acrylate, and 2-perfluorohexadecylethyl acrylate, and the like. These can be used alone or in combination of two or more.

Of these, n-butyl acrylate is preferable from the viewpoints of impact resistance of the thermoplastic resins, cost, and easy availability. In the case that oil resistance is required for the composition, n-ethyl acrylate is preferable. Moreover, in the case that low-temperature performance is required, 2-ethylhexyl acrylate is preferable. Furthermore, when both of oil resistance and low-tempeature performance are required, a mixture of n-ethyl acrylate, n-butyl acrylate, and 2-methoxyethyl acrylate is preferable.

Examples of the vinyl monomer copolymerizable with the methacrylate ester which constitutes the block (B) include a methacrylate ester, an aromatic alkenyl compound, a vinyl cyanide compound, a conjugated diene compound, a halogen-containing unsaturated compound, an unsaturated dicarboxylic acid compound, a vinyl ester compound, a maleimide compound, and the like.

Examples of the methacrylate ester include aliphatic hydrocarbon (e.g., alkyl) esters of methacrylic acid, such as methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate and stearyl methacrylate; alicyclic hydrocarbon esters of methacrylic acid, such as cyclohexyl methacrylate and isobornyl methacrylate; aralkyl esters of methacrylic acid, such as benzyl methacrylate; aromatic hydrocarbon esters of methacrylic acid, such as phenyl methacrylate and toluyl methacrylate; esters of methacrylic acid with a functional group-containing alcohol having an ethereal oxygen, such as 2-methoxyethyl methacrylate and 3-methoxybutyl methacrylate; fluorinated alkyl esters of methacrylic acid, such as trifluoromethylmethyl methacrylate, 2-trifluoromethylethyl methacrylate, 2-perfluoroethylethyl methacrylate, 2-perfluoroethyl-2-perfulorobutylethyl methacrylate, 2-perfluoroethyl methacrylate, perfluoromethyl methacrylate, diperfluoromethylmethyl methacrylate, 2-perfluoromethyl-2-perfuloroetylmethyl methacrylate, 2-perfluorohexylethyl methacrylate, 2-perfluorodecylethyl methacrylate, and 2-perfluorohexadecylethyl methacrylate, and the like.

Examples of the aromatic alkenyl compound include styrene, α-methyl styrene, p-methyl styrene, p-methoxyl styrene, and the like. Examples of the vinyl cyanide compound include acrylonitrile, methacrylonitrile, and the like.

Examples of the conjugated diene compound include butadiene, isoprene, and the like.

Examples of the halogen-containing unsaturated compound include vinyl chloride, vinylidene chloride, perfluoroethylene, perfluoropropylene, vinylidene fluoride, and the like.

Examples of the unsaturated dicarboxylic acid compound include maleic anhydride, maleic acid, monoalkyl esters and dialkyl esters of maleic acid, fumaric acid, monoalkyl esters and dialkyl esters of fumaric acid, and the like.

Examples of the vinyl ester compound include vinyl acetate, vinyl propionate, vinyl pivalate, vinyl beozoate, vinyl cinnamate, and the like.

Examples of the maleimide compound include maleimide, methylmaleimide, ethylmaleimide, propylmaleimide, butylmaleimide, hexylmaleimide, octylmaleimide, dodecylmaleimide, stearylmaleimide, phehylmaleimide, cyclohexylmaleimide, and the like.

These are used alone or in combination of two or more. A preferable vinyl monomer can be selected out of these according to glass transition temperature, modulus of elasticity, and polarity required for the block (B) and physical properties required for the composition. For example, for the purpose of enhancing oil resistance of the composition, acrylonitrile can be copolymerized.

The glass transition temperature of the block (B) is preferably 25° C. or lower, more preferably 0° C. or lower, and further preferably −20° C. or lower. When the glass transition temperature is higher than 25° C., impact resistance of the thermoplastic resin-are sometimes insufficient.

The glass transition temperature (Tg) of the above polymer block (B) can be set by setting the weight ratio of the monomer in each polymer part according to the above Fox equation. The glass transition temperature is calculated according to the Fox equation using the value described in Polymer Handbook Third Edition (Wiley-Interscience, 1989) as the glass transition temperature of each polymerized monomer.

<Reactive Functional Group (C)>

The reactive functional group (C) is preferably at least one group selected from the group consisting of an epoxy group, a hydrolyzable silyl group, a hydroxyl group, an amino group, a carboxyl group, an acid anhydride group, an alkenyl group, an active chlorine group, and an oxazoline group, more preferably an epoxy group or a hydrolyzable silyl group, and further preferably an epoxy group. These functional groups can be optionally selected.

The following will describe an epoxy group, a hydrolyzable silyl group, a hydroxyl group, an amino group, a carboxyl group, an acid anhydride group, an alkenyl group, and an active chlorine group among the functional groups preferable as the reactive functional group (C).

(Epoxy Group)

An epoxy group easily reacts with a carboxylic acid or a hydroxyl group or an amino group, so that an epoxy group can be reacted with a polymer containing such a polar group. The resin to be reacted is not particularly limited and examples thereof include polyester-based resins, polyamide-based resins, and polycarbonate-based resins. Also, an epoxy group can be suitably used for a high-polar resins such as a vinyl chloride-based resin or an acrylonitrile-butadiene-styrene copolymer (ABS) resin.

The epoxy group is not particularly limited as far as it is an organic group containing an epoxy group, and examples thereof include aliphatic hydrocarbon (e.g., alkyl) groups containing an epoxy ring, such as a 1,2-epoxyethyl group, a 2,3-epoxypropyl group (i.e., a glycidyl group), and a 2,3-epoxy-2-methylpropyl group; alicyclic hydrocarbon groups containing an epoxy ring, such as a 3,4-epoxycyclohexyl group; and the like. These may be selected depending on desired reactivity, reaction rate, availability, cost, etc., without particular limitation. Of these, a glycidyl group is most preferable from the viewpoint of easy availability.

Examples of the monomer having an epoxy group include esters of methacrylic acid with an organic group-containing alcohol containing an epoxy ring, such as glycidyl methacrylate, 2,3-epoxy-2-methylpropyl methacrylate, and (3,4-epoxycyclohexyl)methyl methacrylate; esters of acrylic acid with an organic group-containing alcohol containing an epoxy group, such as glycidyl acrylate, 2,3-epoxy-2-methylpropyl acrylate, and (3,4-epoxycyclohexyl)methyl acrylate; epoxy group-containing unsaturated compounds such as 4-vinyl-1-cyclohexene 1,2-epoxide; and the like. These may be selected depending on desired reactivity, reaction rate, availability, cost, etc., without particular limitation. Of these, glycidyl methacrylate and glycidyl acrylate are most preferable from the viewpoint of easy availability.

(Hydrolyzable Silyl Group)

As the hydrolyzable silyl group, a group represented by the general formula (1):

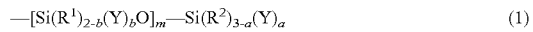 (1)

wherein $R^1$ and $R^2$ each represents an alkyl group having 1 to 20 carbon atoms, an aryl group having 6 to 20 carbon atoms, an aralkyl group having 7 to 20 carbon atoms, or a triorganosiloxy group represented by $(R')_3SiO$— where R' is a monovalent hydrocarbon group having 1 to 20 carbon atoms and three R's may be the same or different; when two or more of $R^1$ or $R^2$ are present, they may be the same or different; Y represents a hydroxyl group or a hydrolyzable group and when two or more of Y are present, they may be the same or different; a represents 0, 1, 2, or 3; b represents 0, 1, or 2; m represents an integer of 0 to 19; and $a+m \times b \geq 1$.

Examples of the hydrolyzable group include generally employed groups such as hydrogen atom, an alkoxy group, an acyloxy group, a ketoximate group, an amino group, an amido group, an aminoxy group, a mercapto group, and an alkenyloxy group. Of these, an alkoxy group, an amido group, and an aminoxy group are preferable and an alkoxy group is particularly preferable from the viewpoint of mild hydrolyzability and easy handling.

The hydrolyzable group and hydroxyl group may be bonded to one silicone atom in the range of 1 to 3, and (a+Σb) is preferably in the range of 1 to 5. In the case that two or more of the hydrolyzable group and hydroxyl group are bonded in the reactive silyl group, they may be the same or different. The number of the silicone atom which forms the reactive silyl group is one or more. In the case that the silicone atoms are linked through a siloxane linkage, the number is preferably 20 or less. In particular, the reactive silyl group represented by the general formula (2) is preferable since the group is easily available.

 (2)

In the formula, $R^2$, Y, and a are the same as above.

Examples of the hydrolyzable silyl group include trialkoxysilyl groups such as a trimethoxysilyl group, a triethoxysilyl group, a tripropoxysilyl group, a triisopropoxysilyl group, and a tributoxysilyl group, dialkoxyalkylsilyl groups such as a dimethoxymethylsilyl group, a diethoxymethylsilyl group, a dipropoxymethylsilyl group, a dibutoxymethylsilyl group, a dimethoxyethylsilyl group, a diethoxyethylsilyl group, a dipropoxyethylsilyl group, and a dibutoxyethylsilyl group; alkoxydialkylsilyl groups such as a methoxydimethylsilyl group, an ethoxydimethylsilyl group, a propoxydimethylsilyl group, a butoxydimethylsilyl group, a methoxydiethylsilyl group, an ethoxydiethylsilyl group, a propoxydiethylsilyl group, and a butoxydiethylsilyl group; and the like.

These may be selected depending on desired reactivity, reaction rate, availability, cost, etc., without particular limitation. The following will illustrate a design which matches desired reactivity. In the case that a high reaction rate is required, the alkoxy group bonded to the silicone atom is preferably a methoxy group or an ethoxy group, and further preferably a methoxy group. In the case that a low reaction rate is required, the alkoxy group bonded to the silicone atom preferably has two or more carbon atoms, and further preferably three or more carbon atoms. The number of the alkoxy group bonded to the silyl group is also not particularly limited. It is suitable to select a trialkoxysilyl group in the case that a high reaction rate, stability of the linkage, or crosslinking density is emphasized, a dialkoxyalkylsilyl group in the case that a low reaction rate or not so large crosslinking density is required, and an alkoxydialkylsilyl group in the case that it is desired to effect not crosslinking but extension of a chain.

Examples of the monomer having a hydrolyzable silyl group include esters of methacrylic acid and an alcohol having the hydrolyzable silyl group, silicon-containing unsaturated compounds, and the like.

Examples of the ester of methacrylic acid and an alcohol having the hydrolyzable silyl group include γ-(methacryloyloxypropyl)trimethoxysilane, γ-(methacryloyloxypropyl)triethoxysilane, γ-(methacryloyloxypropyl)tripropoxysilane, γ-(methacryloyloxypropyl)triisopropoxysilane, γ-(methacryloyloxypropyl)tributoxysilane, γ-(methacryloyloxypropyl)dimethoxymethylsilane, γ-(methacryloyloxypropyl) dimethoxymethylsilane, γ-(methacryloyloxypropyl) diethoxymethylsilane, γ-(methacryloyloxypropyl) dipropoxymethylsilane, γ-(methacryloyloxypropyl) diisopropoxymethylsilane, γ-(methacryloyloxypropyl) dibutoxymethylsilane, and the like. The kind of the hydrocarbon group which links the methacryloyloxy group and the silyl group is not particularly limited but a propyl group is exemplified herein from the viewpoint of easy availability.

Examples of the silicone-containing unsaturated compound include vinyltrimethoxysilane, vinyltriethoxysilane, vinyltripropoxysilane, vinyltriisopropoxysilane, vinyltributoxysilane, vinyldimethoxymethylsilane, vinyldiethoxymethylsilane, vinyldipropoxymethylsilane, vinyldiisopropoxymethylsilane, vinyldibutoxymethylsilane, vinyldimethoxyethylsilane, vinyldiethoxyethylsilane, vinyldipropoxyethylsilane, vinyldiisopropoxyethylsilane, vinyldibutoxyethylsilane, vinylmethoxydimethylsilane, vinylethoxydimethylsilane, vinylpropoxydimethylsilane, vinylisopropoxydimethylsilane, vinylbutoxydimethylsilane, and the like.

(Amino Group)

The amino group is not limited and may be an amino group represented by the general formula (3):

wherein $R^3$ is hydrogen or an organic group having 1 to 20 carbon atoms and two $R^3$'s may be the same or different from each other and may be linked with each other at the other end to form a cyclic structure, or an ammonium salt represented by the general formula (4):

wherein $R^3$ is the same as above and three $R^3$'s may be the same or different from each other and may be linked with each other at the other end to form a cyclic structure, and $Z^-$ is a counter anion.

In the above formula, $R^3$ is hydrogen or an organic group having 1 to 20 carbon atoms and may be hydrogen, an alkyl group having 1 to 20 carbon atoms, an aryl group having 6 to 20 carbon atoms, an aralkyl group having 7 to 20 carbon atoms, and the like.

Examples of the monomer having the amino group include 2-aminoethyl methacrylate, 2-aminoethyl acrylate, and the like.

(Alkenyl Group)

The alkenyl group is not limited but a group represented by the general formula (5):

wherein $R^4$ is a hydrogen atom or a hydrocarbon group having 1 to 20 carbon atoms, and preferably a hydrogen atom.

Examples of the hydrocarbon group having 1 to 20 carbon atoms specifically include the following:
—$(CH_2)_n$—$CH_3$
—$CH(CH_3)$—$(CH_2)_n$—$CH_3$
—$CH(CH_2CH_3)$—$(CH_2)_n$—$CH_3$, —$CH(CH_2CH_3)_2$
—$C(CH_3)_2$—$(CH_2)_n$—$CH_3$
—$C(CH_3)(CH_2CH_3)$—$(CH_2)_n$—$CH_3$
—$C_6H_5$, —$C_6H_4(CH_3)$
—$C_6H_3(CH_3)_2$, —$(CH_2)_n$—$C_6H_5$, —$(CH_2)_n$—$C_6H_4(CH_3)$
—$(CH_2)_n$—$C_6H_3(CH_3)_2$ n is an integer of 0 or more. The total number of carbon atoms in each group is not more than 20.

The bonding mode of the alkenyl group and the main chain of the polymer is not particularly limited but they are preferably bonded through a carbon-carbon bond, an ester bond, an ether bond, a carbonate bond, an amide bond, an urethane bond, and the like.

As the monomer having the alkenyl group, allyl methacrylate and the like may be mentioned, for example.

(Active Chlorine Group)

The active chlorine group is not limited but a group represented by the general formula (6):

wherein $R^5$, $R^6$, $R^7$, and $R^8$ each is a hydrogen atom or a hydrocarbon group having 1 to 20 carbon atoms, preferably a hydrogen atom, and W is a divalent bonding group.

In the above formula (6), examples of $R^5$, $R^6$, $R^7$, and $R^8$ include organic groups having 1 to 20 carbon atoms, such as an alkyl group having 1 to 20 carbon atoms, an aryl group having 6 to 20 carbon atoms, and an aralkyl group having 7 to 20 carbon atoms.

W is a divalent bonding group. As the divalent bonding group, an oxygen atom, a sulfur atom, and the like may be mentioned. Of these, an oxygen atom is preferable. In particular, an active chlorine group represented by the general formula (7):

is preferable since it is easily available.

As the monomer having an active chlorine group, 2-chloroethyl vinyl ether may be mentioned, for example.

(Oxazoline Group)

An oxazoline group reacts with an epoxy group, an amino group, a carboxyl group, an acid anhydride, or the like, and hence can be reacted with the polymer containing such a polar group. The resin to be reacted is not particularly limited as far as it is a polymer containing such a polar group, but a polyester-based resin, a polyamide-based resin, a polycarbonate-based resin, and the like are preferable.

The oxazoline group is not limited, but a group represented by the general formula (8):

is preferable.

In the formula (8), $R_1$, $R_2$, $R_3$, and $R_4$ each independently is a hydrogen atom, a halogen atom, an alkyl group having 1 to 20 carbon atoms, an aralkyl group having 7 to 20 carbon atoms, a cycloalkyl group, an aryl group having 6 to 20 carbon atoms, and a substituted aryl group.

Examples of the monomer having the oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline, and the like.

(Hydroxyl Group)

The hydroxyl group is not limited but an alcoholic hydroxyl group is preferable.

Examples of the monomer having the hydroxyl group include 2-hydroxyethyl methacrylate, 2-hydroxypropyl methacrylate, ethylene oxide adducts of methacrylic acid, 2-hydroxyethyl acrylate, 2-hydroxypropyl acrylate, ethylene oxide adducts of acrylic acid, and the like.

(Acid Anhydride Group)

The acid anhydride group is not limited, but anhydrides of carboxylic acids are preferable. Of these, any point in the polymer being a basal point, an anhydride of a 1,2-dicarboxylic acid (5-membered ring), an anhydride of a 1,3-dicarboxylic acid (6-membered ring), an anhydride of a 1,4-dicarboxylic acid (7-membered ring), or the like may be mentioned.

Examples of the monomer having the acid anhydride group include maleic anhydride, acrylic anhydride, methacrylic anhydride, and the like.

<Method for Introducing Reactive Functional Group (C)>

In the case that the reactive functional group (C) is contained in the block copolymer, methods for introducing the reactive functional group (C) will be described below. The methods are roughly classified into a method for introducing a monomer having the reactive functional group (C) to a polymer block by polymerization and a method for introducing the reactive functional group (C) to the end of a molecular chain by converting a terminal functional group. The following will describe each method.

In the method for introducing a monomer having the reactive functional group (C) to a polymer block, the functional group (C) is to be contained in both of the methacrylic polymer block (A) and the acrylic polymer block (B) or in either of them.

By this method, an epoxy group, a hydrolyzable silyl group, a hydroxyl group, an amino group, a carboxyl group, an active chlorine group, and an oxazoline group can be introduced.

In that case, examples of the monomer having the reactive functional group (C) include methacrylic acid or methacrylate esters, acrylic acid or acrylate esters, silicone-containing unsaturated compounds, epoxy group-containing unsaturated compounds, active chlorine group-containing unsaturated compounds, and the like. Specific examples are mentioned in the above but the monomer containing the reactive functional group (C) is not limited thereto.

In the method for introducing the reactive functional group (C) to the end of a molecular chain by converting a terminal functional group, the reactive functional group (C) is bonded to the end of a molecular chain directly or though an appropriate organic group.

As methods for synthesizing a block copolymer having a hydrolyzable group at the end, there may be mentioned, for example, a method of adding a hydrosilane compound having a hydrolyzable silyl group to a block copolymer having an alkenyl group at the end in the presence of a hydrosilylation catalyst; a method of reacting a block copolymer having a hydroxyl group at the end with a compound having a reactive silyl group and a group capable of reacting with a hydroxyl group such as an isocyanate group in one molecule; and the like.

As a method for synthesizing a block copolymer having an alkenyl group at the end, there is, for example, a method of reacting a block copolymer having a highly reactive carbon-halogen bond at the end with an oxy anion or a carboxylate anion having an alkenyl group to substitute the halogen.

As a method for synthesizing a block copolymer having a hydroxyl group at the end, there is, for example, a method of reacting a block copolymer having a highly reactive carbon-halogen bond at the end with an oxy anion or a carboxylate anion having a hydroxyl group to substitute the halogen. The block copolymer having a highly reactive carbon-halogen bond at the end mentioned herein can be obtained by living radical polymerization mentioned later. By these methods, the hydrolyzable silyl group, alkenyl group, and hydroxyl group can be introduced.

Furthermore, a carboxyl group and an acid anhydride group can be introduced by subjecting ester part of the monomer introduced into the polymer block through polymerization to a functional group-converting reaction.

As a method for synthesizing a block copolymer having a carboxyl group, there is, for example, a method of synthesizing a block copolymer containing a monomer having a functional group which is a precursor of the carboxyl group, such as t-butyl methacrylate, t-butyl acrylate, trimethylsilyl methacrylate, or trimethylsilyl acrylate and then forming a carboxylic acid by a known chemical reaction such as hydrolysis or acidolysis, e.g., any of the methods described in JP-A-10-298248, JP-A-2001-234146, and so on.

As a method for synthesizing a block copolymer having an acid anhydride group, the above block copolymer having a carboxyl group is heated to effect dehydration or dealcoholation, whereby ester parts of adjacent monomers can be converted into a carboxylic acid anhydride.

Alternatively, ester parts of adjacent monomers can be converted into a carboxylic acid anhydride by synthesizing a block copolymer containing a monomer having a functional group which is a precursor of carboxyl group, such as t-butyl methacrylate, t-butyl acrylate, trimethylsilyl methacrylate, or trimethylsilyl acrylate and then heating to effect dealcoholation.

Moreover, by using an organic halide or halogenated sulfonyl compound having a functional group other than a polymerization-initiating one as an initiator at the production of the block copolymer by living radical polymerization to be mentioned later, a polymer to which an alkenyl group, a hydroxyl group, an epoxy group, an amino group, an amido group, a hydrolyzable silyl group, or the like is introduced can be easily obtained.

Furthermore, an olefin can be formed at an end or at an inner part by thermally treating a block copolymer having a highly reactive carbon-halogen bond obtained by living radical polymerization to be mentioned later to effect a dehydrohalogenation reaction.

<Process for Preparing Block Copolymer (b)>

Process for producing the above block copolymer is not particularly limited, but controlled polymerization using a polymer initiator is preferably used. Examples of the controlled polymerization include living anion polymerization, radical polymerization using a chain transfer agent and recently developed living radical polymerization. Of these, living radical polymerization is preferable from the viewpoint of controlling molecular weight and structure of the block copolymer.

The living radical polymerization refers to radical polymerization, which maintains activity at the polymerizing end. The living polymerization narrowly means polymerization in which the end always maintains activity, while it generally includes pseudoliving polymerization, which has activated and inactivated ends in an equilibrium state. The definition herein is also the latter one. Recently, various parties are making active researches on the living radical polymerization.

Examples thereof include polymerization using a chain transfer agent such as a polysulfide, polymerization using a radical trapping agent such as a cobalt porphyrin complex (J. Am. Chem. Soc., Vol. 116, 7943 (1994)) or a nitroxide compound (Macromolecules, Vol. 27, 7228 (1994)), atom transfer radical polymerization (ATRP) which uses an organic halide or the like as an initiator with a transition metal complex as a catalyst. There is no particular limitation for the use of any of these methods, but the atom transfer radical polymerization is preferable from the viewpoint of easy control.

In the atom transfer radical polymerization, the polymerization is initiated by an organic halide or a halogenated sulfonyl compound as an initiator with a metal complex whose central metal is an element selected from the eighth, ninth, tenth or eleventh group in the periodic table as a catalyst (for example, Matyjaszewski et al., J. Am. Chem. Soc., Vol. 117, 5614 (1995), Macromolecules Vol. 28, 7901 (1995), Science, Vol. 272, 866 (1995), or Sawamoto et al. Macromolecules Vol. 28, 1721 (1995)).

According to these methods, although the polymerization proceeds at a very high polymerization rate and is radical polymerization in which termination reactions such as coupling between radicals are apt to occur, it proceeds in a living manner to afford a polymer which has a narrow molecular weight distribution (Mw/Mn=1.1 to 1.5) and the molecular weight can be controlled at will by changing the charging ratio of the monomer to the initiator.

In the atom transfer radical polymerization method, the organic halide or halogenated sulfonyl compound used as an initiator includes a mono-functional, di-functional or multi-functional compound. These may be selected depending on the purpose. In the case of producing a di-block copolymer, the mono-functional compound is preferable from the viewpoint of easy availability of the initiator. In the case of producing an A-B-A type tri-block copolymer or a B-A-B type tri-block copolymer, the di-functional compound is preferable from the viewpoints of number of reaction steps and time saving. In the case of producing a branched block copolymer, the multi-functional compound is preferable from the viewpoints of number of reaction steps and time saving.

Moreover, a polymer initiator can be also used as the above initiator. The polymer initiator refers to, among the organic halides and halogenated sulfonyl compounds, a compound comprising a polymer to which a halogen atom is bonded at the end of a molecular chain. Since such a polymer initiator can be produced by a controlled polymerization method other than the living radical polymerization, there is a feature that a block copolymer which is a combination of polymers obtained by different polymerization methods can be obtained.

Examples of the mono-functional compound include compounds represented by $C_6H_5$—$CH_2X$,
$C_6H_5$—$C(H)(X)$—$CH_3$,
$C_6H_5$—$C(X)(CH_3)_2$,
$R^1$—$C(H)(X)$—$CO$—$R^2$,
$R^1$—$C(CH_3)(X)$—$COOR^2$,
$R^1$—$C(H)(X)$—$CO$—$R^2$,
$R^1$—$C(CH_3)(X)$—$CO$—$R^2$,
$R^1$—$C_6H_5$—$SO_2X$, and the like.

In the formulae, $C_6H_5$ represents a phenyl group, and $C_6H_4$ represents a phenylene group (any of ortho-substituted, meta-substituted, and para-substituted); $R^1$ represents a hydrogen atom, an alkyl group having 1 to 20 carbon atoms, an aryl group having 6 to 20 carbon atoms, or an aralkyl group having 7 to 20 carbon atoms; X represents chlorine, bromine, or iodine; and $R^2$ represents a monovalent organic group having 1 to 20 carbon atoms.

For $R^1$, specific examples of the alkyl group having 1 to 20 carbon atoms including alicyclic hydrocarbon groups include a methyl group, an ethyl group, a propyl group, an isopropyl group, an n-butyl group, an isobutyl group, a t-butyl group, an n-pentyl group, an n-hexyl group, a cyclohexyl group, an n-heptyl group, an n-octyl group, a 2-ethylhexyl group, a nonyl group, a decyl group, a dodecyl group, an isobornyl group, and the like. Specific examples of the aryl group having 6 to 20 carbon atoms include a phenyl group, a tolyl group, a naphthyl group, and the like. Specific examples of the aralkyl group having 7 to 20 carbon atoms include a benzyl group, a phenethyl group, and the like.

Specific examples of the mono-functional compound include tosyl bromide, methyl 2-bromopropionate, ethyl 2-bromopropionate, butyl 2-bromopropionate, methyl 2-bromoisobutyrate, ethyl 2-bromoisobutyrate, butyl 2-bromoisobutyrate, and the like. Of these, ethyl 2-bromopropionate and butyl 2-bromopropionate are preferable from the viewpoint of easy control of the polymerization, since they are similar in structure to an acrylate ester monomer.

Examples of the di-functional compound include compounds represented by

X—$CH_2$—$C_6H_4$—$CH_2$—X,
X—$CH(CH_3)$—$C_6H_4$—$CH(CH_3)$—X,
X—$C(CH_3)_2$—$C_6H_4$—$C(CH_3)_2$—X,
X—$CH(COOR^3)$—$(CH_2)_n$—$CH(COOR^3)$—X,
X—$C(CH_3)(COOR^3)$—$(CH_2)_n$—$C(CH_3)(COOR^3)$—X,
X—$CH(COR^3)$—$(CH_2)_n$—$CH(COR^3)$—X,
X—$C(CH_3)(COR^3)$—$(CH_2)_n$—$C(CH_3)(COR^3)$—X,
X—$CH_2$—$CO$—$CH_2$—X,
X—$CH(CH_3)$—$CO$—$CH(CH_3)$—X,
X—$C(CH_3)_2$—$CO$—$C(CH_3)_2$—X,
X—$CH(C_6H_5)$—$CO$—$CH(C_6H_5)$—X,
X—$CH_2$—$COO$—$(CH_2)_n$—$OCO$—$CH_2$—X,
X—$CH(CH_3)$—$COO$—$(CH_2)N$—$OCO$—$CH(CH_3)$—X,
X—$C(CH_3)_2$—$COO$—$(CH_2)_n$—$OCO$—$C(CH_3)_2$—X,
X—$CH_2$—$CO$—$CO$—$CH_2$—X,
X—$CH(CH_3)$—$CO$—$CO$—$CH(CH_3)$—X,
X—$C(CH_3)_2$—$CO$—$CO$—$C(CH_3)_2$—X,
X—$CH_2$-Coo-$C_6H_4$—$OCO$—$CH_2$—X,
X—$CH(CH_3)$—$COO$—$C_6H_4$—$OCO$—$CH(CH_3)$—X,
X—$C(CH_3)_2$—$COO$—$C_6H_4$—$OCO$—$C(CH_3)_2$—X,
X—$SO_2$—$C_6H_4$—$SO_2$—X, and the like.

In the formulae, $R^3$ represents an alkyl group having 1 to 20 carbon atoms, an aryl group having 6 to 20 carbon atoms, or an aralkyl group having 7 to 20 carbon atoms; n represents an integer of 0 to 20; and $C_6H_5$, $C_6H_4$, and X are the same as above.

Specific examples of the alkyl group having 1 to 20 carbon atoms, aryl group having 6 to 20 carbon atoms, or aralkyl group having 7 to 20 carbon atoms for $R^3$ are the same as specific examples of the alkyl group having 1 to 20 carbon atoms, aryl group having 6 to 20 carbon atoms, or aralkyl group having 7 to 20 carbon atoms for $R^1$ and hence explanation thereof are omitted.

Specific examples of the di-functional compound include bis(bromomethyl)benzene, bis(1-bromoethyl)benzene, bis(1-bromoisopropyl)benzene, dimethyl 2,3-dibromosuccinate, diethyl 2,3-dibromosuccinate, dibutyl 2,3-dibromosuccinate, dimethyl 2,4-dibromoglutarate, diethyl 2,4-dibromoglutarate, dibutyl 2,4-dibromoglutarate, dimethyl 2,5-dibromoadipate, diethyl 2,5-dibromoadipate, dibutyl 2,5-dibromoadipate, dimethyl 2,6-dibromopimelate, diethyl 2,6-dibromopimelate, dibutyl 2,6-dibromopimelate, dimethyl 2,7-dibromosuberate, diethyl 2,7-dibromosuberate, dibutyl 2,7-dibromosuberate, and the like. Of these, bis(bromomethyl)benzene, diethyl 2,5-dibromoadipate, and diethyl 2,6-dibromopimelate are preferable from the viewpoint of availability of starting materials.

Examples of the multi-functional compound include compounds represented by $C_6H_3$—$(CH_2$—$X)_3$,
$C_6H_3$—$(CH(CH_3)$—$X)_3$,
$C_6H_3$—$(C(CH_3)_2$—$X)_3$,
$C_6H_3$—$(OCO$—$CH_2$—$X)_3$,
$C_6H_3$—$(OCO$—$CH(CH_3)$—$X)_3$,
$C_6H_3$—$(OCO$—$C(CH_3)_2$—$X)_3$,
$C_6H_3$—$(SO_2$—$X)_3$, and the like.

In the formulae, $C_6H_3$ represents a trivalent phenyl group where the positions of the three bonding hands may be any combination of 1-position to 6-position, and X is the same as above.

Specific examples of the multi-functional compound include tris(bromomethyl)benzene, tris(1-bromoethyl)benzene, tris(1-bromoisopropyl)benzene, and the like. Of these, tris(bromomethyl)benzene is preferable from the viewpoint of availability of starting materials.

Additionally, there can be provided a polymer to which a functional group other than the group that initiates polymerization has been easily introduced at the end or in the molecule by using an organic halide or halogenated sulfonyl compound having a functional group other than the group that initiates polymerization. Examples of such a functional group other than the group that initiates polymerization include an alkenyl group, a hydroxyl group, an epoxy group, an amino group, an amido group, a silyl group, and the like.

In the organic halogenated compound or the haloganated sulfonyl compound which can be used as the above initiator, a carbon atom to which a halogen group (a halogen atom) is attached bonds to a carbonyl group, a phenyl group, or the like and thus the carbon-halogen bond is activated to initiate the polymerization. The amount of the initiator to be used may be determined depending on its ratio to the monomers in accordance with the molecular weight of the required block copolymer. That is, the molecular weight of the block copolymer can be controlled depending on number of molecules of monomers to be used per one molecule of the initiator.

The transition metal catalyst to be used as the catalyst for the above atom transfer radical polymerization is not particularly limited but preferably includes a complex of monovalent or zero-valent copper, a complex of bivalent ruthenium and a complex of bivalent iron, and a complex of bivalent nickel.

Of these, the complex of the copper is preferable from the viewpoint of costs and control of the reaction. Examples of the monovalent copper compound include copper(I) chloride, copper(I) bromide, copper(I) iodide, copper(I) cyanide, copper(I) oxide, copper(I) perchlorate, and the like. Of these, copper(I) chloride and copper(I) bromide are preferable from the viewpoint of control of the polymerization. When the monovalent copper compound is used, a 2,2'-bipyridyl-based compound such as 2,2'-bipyridyl and a derivative thereof, e.g., 4,4'-dinolyl-2,2'-bipyridyl, 4,4'-di(5-nolyl)-2,2'-bipyridyl, or the like; a 1,10-phenanthroline-based compound such as 1,10-phenanthroline and a derivative thereof, e.g., 4,7-dinolyl-1,10-phenanthroline or the like; and a polyamine such as tetramethylethylenetriamine (TMEDA), pentamethyldiethylenetriamine, or hexamethyl(2-aminoethyl)amine may be added as a ligand for improving catalytic activity.

Moreover, a tristriphenylphosphine complex of bivalent ruthenium chloride ($RuCl_2(PPh_3)_3$) is also preferable as a catalyst. An aluminum alkoxide can be added as an activator when a ruthenium compound is used as the catalyst. A bistriphenylphosphine complex of bivalent iron ($FeCl_2(PPh_3)_2$), a bistriphenylphosphine complex of bivalent nickel ($NiCl_2(PPh_3)_2$) and a bistributylphosphine complex of bivalent nickel ($NiBr_2(PBu_3)_2$) are also preferable as the catalyst.

The catalyst, ligand and activator to be used are not particularly limited, but may be suitably determined depending on the relationship between the initiator, monomer and solvent and the required reaction rate. For example, in the polymerization of an acrylic monomer such as an acrylate ester, since the growing end of the polymer chain preferably has a carbon-bromine bond from the viewpoint of control of the polymerization, it is preferable that the initiator to be used is an organic bromide or a sulfonyl bromide and the solvent is acetonitrile, and it is preferable that a ligand such as pentamethyldiethylenetriamine is used with the use of a metal complex catalyst containing copper, which is contained in copper bromide, preferably copper(I) bromide as a central metal. Moreover, in the polymerization of a methacrylic monomer such as a methacrylate ester, since the growing end of the polymer chain preferably has a carbon-chlorine bond from the viewpoint of control of the polymerization, it is preferable that the initiator to be used is an organic chloride or a sulfonyl chloride and the solvent is acetonitrile or, as required, a mixed solvent with toluene or the like, and it is preferable that a ligand such as pentamethyldiethylenetriamine is used with the use of a metal complex catalyst containing copper, which is contained in copper chloride, preferably copper(I) chloride as a central metal.

The amounts of catalyst and ligand may be suitably determined depending on the relationship between the amounts of the initiator, monomer, and solvent to be used and the required reaction rate. For example, in the case of obtaining a polymer having a high molecular weight, the ratio of initiator/monomer should be lower than the case of obtaining a polymer having a low molecular weight, and in such a case, the reaction rate can be enhanced by increasing the amounts of the catalyst and ligand. Moreover, in the case of forming a polymer having a glass transition temperature higher than room temperature, when an appropriate organic solvent is added for lowering the viscosity of the system and thereby enhancing stirring efficiency, the reaction rate tends to decrease, but in such a case, the reaction rate can be enhanced by increasing the amounts of the catalyst and ligand.

The above atom transfer radical polymerization can be carried out without any solvent (bulk polymerization) or in various solvents. Also, in bulk polymerization or polymerization in various solvent, the polymerization may be stopped on the way.

As the above solvent, for example, a hydrocarbon solvent, an ether solvent, a halogenated hydrocarbon solvent, a ketone solvent, an alcohol solvent, a nitrile solvent, an ester solvent, a carbonate solvent, or the like may be used.

The hydrocarbon solvent includes benzene, toluene, or the like. The ether solvent includes diethyl ether, tetrahydrofuran, or the like. The halogenated hydrocarbon solvent includes methylene chloride, chloroform, or the like. The ketone solvent includes acetone, methyl ethyl ketone, methyl isobutyl ketone, or the like. The alcohol solvent includes methanol, ethanol, propanol, isopropanol, n-butanol, t-butanol, or the like. The nitrile solvent includes acetonitrile, propionitrile, benzonitrile, or the like. The ester solvent includes ethyl acetate, butyl acetate, or the like. The carbonate solvent includes ethylene carbonate, propylene carbonate, or the like.

These can be used alone or in combination of two or more.

In the case of using a solvent, the amount thereof may be suitably determined depending on the relationship between the viscosity of the whole system and the required stirring efficiency (i.e. reaction rate). Also, in the case that the polymerization is stopped in the way of bulk polymerization or polymerization in various solvents, the conversion of monomers at the point when the reaction is stopped can be suitably determined depending on the relationship between the viscosity of the whole system and the required stirring efficiency (i.e. reaction rate).

The above polymerization can be carried out in the range of room temperature to 200° C., preferably 50 to 150° C.

In order to produce a block copolymer by the above polymerization, there are a process of adding monomers successively, a process of polymerizing the next block with a previously synthesized polymer as a polymer initiator, a process of combining separately polymerized polymers by reaction, and the like. Any of these processes may be used depending on the object. From the viewpoint of convenience of the production process, a process of adding monomers successively is preferable, and in the case that it is to be avoided to copolymerize the next block with the remaining monomer of the previous block, the process of polymerizing the next block with a previously synthesized polymer as a polymer initiator is preferable.

The following will explain the case of adding monomers successively and the case of polymerizing the next block with a previously synthesized polymer as a polymer initiator in detail but the explanation by no means limits the process for producing the block copolymer of the invention.

In the case of adding monomers successively, it is desirable to charge the next monomer to be polymerized at the time when conversion of previously charged monomer to be polymerized reached 80 to 95%. When the polymerization is allowed to proceed until the conversion exceeds 95%, for example, up to 96 to 100%, there occurs stochastic inhibition of the growing reaction of the polymer chain. Moreover, since polymer radicals are apt to react with each other, side reactions such as disproportionation, coupling, and chin transfer tend to occur. When the next monomer to be polymerized is charged at the time when the conversion is less than 80%, for example, 79% or less, there sometimes arises a problem that the monomer charged for previous polymerization may copolymerize with the monomer to be polymerized next.

In this case, as the order of adding the monomers, there may be a method (x1) wherein an acrylic monomer is first charged and polymerized and then a methacrylic monomer is charge and polymerized and a method (y1) wherein a methacrylic monomer is first charged and polymerized and then an acrylic monomer is charge and polymerized. From the viewpoint of control of the polymerization, the method (x1) wherein an acrylic monomer is first charged and polymerized and then a methacrylic monomer is charge and polymerized is preferable. This is because it is preferable to grow a methacrylic polymer block from the end of an acrylic polymer block.

As the process of polymerizing the next block with a previously synthesized polymer as a polymer initiator, there may be, for example, mentioned a process wherein the temperature is once lowered in a living state at a desired time point in the way of the polymerization of a first block to stop the polymerization and after the monomer of the first block is removed under reduced pressure, the monomer for a second block is added. In the case of polymerizing the third and successive blocks, the polymerization can be effected in the same manner as in the case of the second block. In this process, in the polymerization of the second and successive blocks, the copolymerization of the remaining previous monomer can be avoided.

In this case, as the order of polymerizing the blocks, there may be a method (x2) wherein an acrylic block is first polymerized and then a methacrylic block is polymerized and a method (y2) wherein a methacrylic block is first polymerized and then an acrylic block is polymerized. From the viewpoint of control of the polymerization, the method (x2) wherein an acrylic block is first polymerized and then a methacrylic block is polymerized is preferable. This is because it is preferable to grow a methacrylic polymer block from the end of an acrylic polymer block.

The method for determining conversion of an acrylic monomer, a methacrylic monomer, or the like is described. For determining the conversion, a gas chromatographic (GC) method, a weighing method, and the like are applicable. The GC method is a method of sampling the reaction liquid of the polymerization system before starting the reaction and in the way of the reaction as needed and determining consumption of the monomer based on existing ratio of the monomer to the inner standard substance previously added into the polymerization system. The advantage of the method is possible determination of individual conversions independently even when a plurality of monomers are present in the system. The weighing method is a method of sampling the reaction liquid of the polymerization system and determining solid mass concentration based on the weight before drying and the weight after drying to determine conversion of the monomer as a whole. The advantage of the method is easy determination of the conversion. Of these methods, when a plurality of monomers are present in the system, for example, an acrylic monomer is contained as a copolymerization component of a methacrylic monomer, the GC method is preferable.

<Blending of Thermoplastic Resin (a) and Block Copolymer (b)>

The blending amount of the thermoplastic resin (a) and the block copolymer (b) is not particularly limited but the range of the composition ratio is preferably 99.5 to 30% by weight of the thermoplastic resin (a) and 0.5 to 70% by weight of the block copolymer (b) in the case that modification of impact resistance is mainly aimed. The range is more preferably 99.5 to 50% by weight of the thermoplastic resin (a) and 0.5 to 50% by weight of the block copolymer (b), most preferably 99.5 to 70% by weight of the thermoplastic resin (a) and 0.5 to 30% by weight of the block copolymer (b). When the mixing amount of the block copolymer (b) is less than 0.5% by weight, the improving effect of impact resistance tends to decrease and when it exceeds 70% by weight, the feature of the thermoplastic resin (a) tends to be difficult to appear.

Moreover, in the case that modification of processability is mainly aimed, the range is preferably 99.9 to 70% by weight of the thermoplastic resin (a) and 0.1 to 30% by weight of the block copolymer (b). The range is more preferably 99.5 to 50% by weight of the thermoplastic resin (a) and 0.5 to 50% by weight of the block copolymer (b), most preferably 99.5 to 70% by weight of the thermoplastic resin (a) and 0.5 to 30% by weight of the block copolymer (b). In the case that modification of processability is aimed, the amount of the block copolymer (b) to be added is frequently smaller than the case that modification of impact resistance is aimed, in order not to deteriorate the characteristic properties inherent to the resin. When the blending amount of the block copolymer (b) is less than 0.1% by weight, the improving effect of processability tends to decrease and when it exceeds 30% by weight, the characteristic properties inherent to the thermoplastic resin (a) tends to be difficult to appear.

Furthermore, in the case of obtaining a compound material having a modulus of elasticity between that of a resin and that of an elastomer, the range is preferably 90 to 10% by weight of the thermoplastic resin (a) and 10 to 90% by weight of the block copolymer (b). The range is more preferably 80 to 15% by weight of the thermoplastic resin (a) and 20 to 85% by weight of the block copolymer (b), most preferably 30 to 80% by weight of the thermoplastic resin (a) and 70 to 20% by weight of the block copolymer (b). When the blending amount of the block copolymer (b) is less than 10% by weight, a composition having desired physical properties tends to be difficult to obtain since modulus of elasticity of the composition is about the same as that of the thermoplastic resin (a) and when it exceeds 90% by weight, the feature of the physical properties inherent to the thermoplastic resin (a) tends to be difficult to appear.

The dispersion diameter of the block copolymer (b) to the thermoplastic resin (a) is generally determined depending on the relationship of polarity between the thermoplastic resin (a) and the block copolymer (b), the relationship of viscosity between the thermoplastic resin (a) and the block copolymer (b) at the processing, and the reactivity, number of moles, and existing position of the reactive functional group (C).

The method for decreasing the dispersion diameter is not particularly limited and examples thereof include a method of increasing the amount of the functional group (C), a method of introducing a functional group having a large reactivity of the functional group (C) to the resin (a), a method of decreasing the difference in polarity between the resin (a) and the block copolymer (b), and a method of decreasing the viscosity of the block copolymer (b) at the processing temperature. Contrarily, the method for increasing the dispersion diameter is not particularly limited and examples thereof include a method of decreasing the amount of the functional group (C), a method of suppressing the reactivity of the functional group (C) to the resin (a), a method of increasing the difference in polarity between the resin (a) and the block copolymer (b), and a method of increasing the viscosity of the block copolymer (b) at the processing temperature.

<Reaction Catalyst>

In the composition of the invention, depending on the kind and purpose of the reactive functional group (C), a catalyst for accelerating the reaction between the functional group (C) and the resin (a) or the crosslinking reaction between the functional groups (C) is sometimes necessary.

In the case that the reactive functional group (C) is an epoxy group, the catalyst for accelerating the reaction between the functional group (C) and the resin (a) is not particularly limited but is one compound or a combination of two or more compounds generally selected from the compounds accelerating the reaction of a carboxyic acid group, a hydroxyl group, and ester group with the epoxy group. Examples of such compounds include amine-based compounds such as tertiary amines and quaternary ammonium salts; phosphorus-based compounds such as phosphonium salts and phosphines; and imidazoles. Of these, phosphorus-based compounds are particularly preferable from the viewpoint of thermal stability. Specifically, there are mentioned phosphonium salts such as tetra(n-butyl)phosphonium bromide, tetra(n-butyl)phosphonium chloride, tri(n-butyl)methylphosphonium iodide, tri(n-butyl)benzylphosphonium chloride, and tri(n-butyl)allylphosphonium bromide; phosphines such as triphenylphosphine; and the like.

The amount of the catalyst is in the range of 0.001 to 2 parts by weight, preferably 0.005 to 1 part by weight relative to 100 parts by weight of the resin composition of the invention. When the amount is less than the above range, a reaction-accelerating effect cannot be obtained and when it is more than the range, decrease of mechanical properties is invited.

Moreover, as a curing agent for crosslinking the functional groups (C) and a curing catalyst for accelerating the reaction, a curing agent and a curing catalyst conventionally used for epoxy resins can be used. Examples thereof include polyamines, modified polyamines, acid anhydrides, polyphenols, polymercaptans, isocyanates, organic acids, tertiary amines, imidazoles, Lewis acids, Brønsted acid salts, and the like. Polyamines, modified polyamines, acid anhydrides, polyphenols, polymercaptans, isocyanates, and organic acids themselves react with an epoxy group to effect crosslinking. Tertiary amines, imidazoles, Lewis acids, and Brønsted acid salts are catalysts for polymerization between epoxy groups.

In the case that the reactive functional group (C) is a hydrolyzable silyl group, a silanol-condensing catalyst may be used as a catalyst for accelerating the reaction. Examples of the silanol-condensing catalyst include tetravalent tin compounds, bivalent tin compounds, titanate esters, organoaluminum compounds, chelate compounds, lead octylate, amine-based compounds, salts of amine-based compounds with carboxylic acids or the like, reaction products and mixtures of amine-type compounds with organotin compounds, low-molecular-weight polyamide resins, reaction products of excess polymaines with epoxy compounds, silane-coupling agents, and the like. Other known silanol-condensing catalyst such as an acidic catalyst or a basic catalyst can be also used.

In the case that the reactive functional group (C) is a hydroxyl group, a known esterification catalyst or an ester exchanging catalyst, for example, a tetravalent or bivalent tin compound, a titanate ester, and the like may be mentioned.

<Blending Agent>

In the composition of the invention, depending on the aimed purpose, various blending agents can be added in order to improve physical properties. For example, a reinforcing effect and reduction of cost can be effected by blending a filler. The hardness and modulus of elasticity can be reduced by blending a plasticizer or an unvulcanized rubber. Moreover, in order to adjust physical property balance, a plurality of blending agents can be blended.

The blending agent is not particularly limited but, for example, a rubber, a thermoplastic elastomer, composite rubber particles, a pigment, a filler, a stabilizer, a plasticizer, a lubricant, a flame retardant, and the like may be blended.

The rubber is at least one kind of rubber selected from the group consisting of acrylic polymer rubbers, olefinic polymer rubbers, dienic polymer rubbers, natural rubber, silicone rubbers, and fluorine rubbers.

As the acrylic polymer rubber, a rubber obtained by polymerizing monomers containing an acrylate ester as a main component or a known acrylic rubber can be used without particular limitation. As the acrylic rubber, there are exemplified an acrylic rubber obtained by copolymerizing a monomer composed of ethyl acrylate and/or butyl acrylate with a small amount of one or two or more kinds of the other monomer such as 2-chloroethyl vinyl ether, methyl vinyl ketone, acrylic acid, acrylonitrile, or butadiene.

As the olefinic polymer rubber, there are exemplified butyl rubber, ethylene-propylene rubber, ethylene-propylene-diene rubber, isobutylene polymer rubber, and ethylene-vinyl acetate copolymer rubber.

As the dienic polymer rubber, there are exemplified isoprene rubber, butadiene rubber, 1,2-polybutadiene rubber, styrene-butadiene rubber, chloroprene rubber, nitrile rubber, and acrylonitrile-butadiene rubber.

Of these, choice of acrylic rubber, chloroprene rubber, or nitrile rubber is preferable in the case that oil resistance is required for the composition. By using acrylic rubber as a rubber, a composition having a more excellent oil resistance can be obtained.

The rubber may be an uncrosslinked or crosslinked rubber. The crosslinked rubber is rubber dynamically crosslinked at the melt mixing with a thermoplastic composition or rubber previously crosslinked before mixing with a thermoplastic composition.

Examples of the thermoplastic elastomer include an acrylate-methacrylate block copolymer disclosed in JP-A-2000-154329, an isobutylene-methacrylate block copolymer disclosed in JP-A-2000-154330, a silicone-methacrylate block copolymer disclosed in JP-A-2000-154328, a styrene-butadiene-styrene block copolymer (SBS), a styrene-isoprene-styrene block copolymer (SIS), a styrene-ethylene butylene-styrene block copolymer (SEBS), a styrene-ethylene propylene-styrene block copolymer (SIPS), and a styrene-isobutylene-styrene block copolymer, olefinic thermoplastic elastomers (TPO, TPV), vinyl chloride-based thermoplastic elastomer (TPVC), amide-based thermoplastic elastomers, ester-based thermoplastic elastomers, urethane-based thermoplastic elastomers, and the like.

Examples of the composite rubber particles include methyl methacrylate-butadiene-styrene copolymers (MBS resins), acrylic graft copolymers, acrylic-silicone composite rubber graft copolymers, isobutylene-based graft copolymers, isobutylene-acrylic composite rubber graft copolymers, isobutylene-silicone composite rubber graft copolymers, and the like. MBS resins such as Kaneace B series and Kaneace M series (both manufactured by Kanegafuchi Chemical Industry Co., Ltd.), acrylic graft copolymers such as Kaneace FM series (manufactured by Kanegafuchi Chemical Industry Co., Ltd.), acrylic-silicone composite rubber graft copolymers such as Metablen S-2001 (manufactured by Mitsubishi Rayon Co., Ltd.) are available as industrial products. Polyisobutylene-acrylic composite rubber graft copolymers can be prepared according to the process disclosed in JP-A-9-302169.

Examples of the pigment include titanium oxide, zinc sulfide, zinc oxide, and the like.

As the filler, there are exemplified silica, talc, mica, glass fiber, glass beads, hollow glass beads, glass flakes, neutral clays, carbon fiber, aromatic polyamide fiber, aromatic polyester fiber, vinylon fiber, carbide fiber, silicon carbide fiber, alumina fiber, potassium titanate fiber, metal fiber, carbon black, calcium carbonate, magnesium hydroxide, barium sulfate, asbestos, wollastonite, and the like. These may be used alone or in combination of two or more.

In the case of using the filler, it is suitably used, without limitation, in a ratio of preferably 1 to 100 parts by weight, further preferably 5 to 50 parts by weight relative to 100 parts by weight of the resin composition of the invention.

When the ratio is more than the above range, balance of molding flowability and the like is deteriorated and when it is less than the range, an addition effect tends to decrease.

Examples of the stabilizer as an antioxidant include phenol-based compounds and thio ether-based compounds such as 2,4-bis(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thio-diethylenebis[3-(3,5-di-t-butyl-4-hydroxyphenyl)propionate], octadesyl 3-(3,5-di-t-butyl-4-hydroxyphenyl)propionate, 2,2-thiobis(4-methyl-6-t-butylphenol), 1,3,5-trimethyl-2,4,6-tris(3,5-di-t-butyl-4-hydroxybenzyl)benzene; phosphorus-based compounds such as tetrakis(2,4-di-t-butylphenyl)-4,4'-biphenylene phosphonite and tris(2,4-di-t-butylphenyl)phosphonite; and the like.

Moreover, as the light stabilizer, there are mentioned hindered amine-based compounds such as dimethyl succinate-1-(2-hydroxyethyl)-4-hydroxy-2,2,6,6-tetramethylpiperidine polycondensate, poly[[6-(1,1,3,3-tetramethylbutyl)imino-1,3,5-triazine-2,4-diyl][(2,2,6,6-tetramethyl-4-piperidyl)imino]hexamethylene[2,2,6,6-tetramethylpiperidyl)imino]], and bis(1,2,2,6,6-pentamethyl-4-piperidyl)2-(3,5-di-t-butyl-4-hydroxybenzl)$_2$-n-butylmalonate.

These may be used alone or in combination of two or more. The amount of the stabilizer when used is not limited but is preferably in the range of 0.01 to 20 parts by weight relative to 100 parts by weight of the resin composition of the invention. When the amount is less than the above range, a stabilizer-added effect is not sufficient and when it is more than the range, mechanical properties tend to decrease.

Examples of the plasticizer include paraffin-based process oil, naphthene-based process oil, aromatic process oil, light oil, spindle oil, machine oil, linseed oil, sesame oil, castor oil, tsubaki oil, liquid polybutene, liquid polyisoprene, dioctyl phthalate, dibutyl phthalate, dioctyl adipate, tricresyl phosphate, and the like.

Examples of the lubricant include polyethylene wax, polypropylene wax or montanate-based wax;

Examples of the flame retardant include halogenated flame retardants such as tetrabromobisphenol A, 2,2-bis(4-hydroxy-3,5-dibromophenyl)propane, hexabromobenzene, tris(2,3-dibromopropyl)isocyanurate, 2,2-bis(4-hydroxyethoxy-3,5-dibromophenyl)propane, decabromodiphenyl oxide, brominated polyphosphate, chlorinated polyphosphate, and chlorinated paraffin; phosphorus-based flame retardants such as ammonium phosphate, tricresyl phosphate, triethyl phosphate, trischloroethyl phosphate, tris(β-chloroethyl) phosphate, trisdichloropropyl phosphate, cresyl phenyl phosphate, xylenyl diphenyl phosphate, acidic phosphate esters, and nitrogen-containing phosphorus compounds; inorganic flame retardants such as red phosphorus, tin oxide, antimony trioxide, zirconium hydroxide, barium metaborate, aluminum hydroxide, and magnesium hydroxide; polymer flame retardants such as brominated polystyrene, brominated poly-α-methylstyrene, brominated polycarbonate, brominated polyepoxy resin, chlorinated polyethylene, chlorinated poly-α-methylstyrene, chlorinated polycarbonate, and chlorinated polyepoxy resin. These may be used alone or in combination of two or more.

The amount of the above flame retardant when used is not limited but is suitably in a ratio of preferably 1 to 50 parts by weight, further preferably 3 to 30 parts by weight relative to 100 parts by weight of the resin composition of the invention. When the amount is less than the range, a flame retardancy-imparting effect is not obtained and when it is more than the range, decrease of molding flowability and decrease of mechanical properties tend to be invited.

<Production of Thermoplastic Composition>

As a process for blending and producing a thermoplastic resin composition of the invention, use can be made of a known process, e.g., a process for mechanical mixing of the composition using a known apparatus such as a Banbury mixer, roll mill or twin-screw extruder and shaping it into pellets. The shaped pellets are moldable in the wide temperature range, and for the molding, there may be used conventional injection molding machine, blow molding machine, extrusion molding machine, compression molding machine, or the like.

<Detailed Exemplification of the Invention>

The following will exemplify designs according to desired physical properties in the invention but the scope of the invention is not limited thereto.

The following will exemplify block copolymers usable in the invention. EA, BA, MEA, MMA, TSMA, DSMA, GMA, IBMA, 2EHA, CHMA, MA, MAH, HEA, and HEMA herein mean ethyl acrylate, butyl acrylate, 2-methoxyethyl acrylate, methyl methacrylate, γ-(methacryloyloxypropyl)trimethoxysilane, γ-(methacryloyloxypropyl)dimethoxysilane, glycidyl methacrylate, isobornyl methacrylate, 2-ethylhexyl acrylate, cyclohexyl methacrylate, methacrylic acid, methacrylic anhydride, hydroxyethyl acrylate, and hydroxyethyl methacrylate, respectively. Moreover, A-b-B means a block copolymer composed of a block containing an A component as a main component and a block containing B component as a main component. Furthermore, (A/B) means that A and B are randomly copolymerized.

Methacrylic anhydride contains two polymerizable double bonds but the examples show those polymerized side by side in the same polymer main chain.

Examples of a di-block polymer having an epoxy group include (MMA/GMA)-b-BA, (MMA/GMA)-b-EA, (MMA/GMA)-b-(BA/EA/MEA), (MMA/GMA)-b-2EHA, (IBMA/GMA)-BA, (IBMA/GMA)-b-EA, (IBMA/GMA)-b-(BA/EA/MEA), (IBMA/GMA)-b-2EHA, and the like.

Examples of a di-block polymer having a silyl group include (MMA/TSMA)-b-BA, (MMA/TSMA)-b-EA, (MMA/TSMA)-b-(BA/EA/MEA), (MMA/TSMA)-b-2EHA, (MMA/DSMA)-b-BA, (MMA/DSMA)-b-EA, (MMA/DSMA)-b-(BA/EA/MEA), (MMA/DSMA)-b-2EHA, (IBMA/TSMA)-b-BA, (IBMA/TSMA)-b-EA, (IBMA/TSMA)-b-(BA/EA/MEA), (IBMA/TSMA)-b-2EHA, (IBMA/DSMA)-b-BA, (IBMA/DSMA)-b-EA, (IBMA/DSMA)-b-(BA/EA/MEA), (IBMA/DSMA)-b-2EHA, and the like.

Examples of a tri-block polymer having an epoxy group include (MMA/GMA)-b-BA-b-(MMA/GMA), (MMA/GMA)-b-EA-b-(MMA/GMA), (MMA/GMA)-b-(BA/EA/MEA)-b-(MMA/GMA), (MMA/GMA)-b-2EHA-b-(MMA/GMA), (CHMA/GMA)-b-BA-b-(CHMA/GMA), (CHMA/GMA)-b-EA-b-(CHMA/GMA), (CHMA/GMA)-b-(BA/EA/MEA)-b-(CHMA/GMA), (CHMA/GMA)-b-2EHA-b-(CHMA/GMA), (IBMA/GMA)-b-BA-b-(IBMA/GMA), (IBMA/GMA)-b-EA-b-(IBMA/GMA), (IBMA/GMA)-b-(BA/EA/MEA)-b-(IBMA/GMA), (IBMA/GMA)-b-2EHA-b-(IBMA/GMA), and the like.

Examples of a tri-block polymer having a silyl group include (MMA/TSMA)-b-BA-b-(MMA/TSMA), (MMA/TSMA)-b-EA-b-(MMA/TSMA), (MMA/TSMA)-b-(BA/EA/MEA)-b-(MMA/TSMA), (MMA/TSMA)-b-2EHA-b-(MMA/TSMA), (MMA/DSMA)-b-BA-b-(MMA/DSMA), (MMA/DSMA)-b-EA-b-(MMA/DSMA), (MMA/DSMA)-b-(BA/EA/MEA)-b-(MMA/DSMA), (MMA/DSMA)-b-2EHA-b-(MMA/DSMA), (CHMA/TSMA)-b-BA-b-(CHMA/TSMA), (CHMA/TSMA)-b-EA-b-(CHMA/TSMA), (CHMA/TSMA)-b-(BA/EA/MEA)-b-(CHMA/TSMA), (CHMA/TSMA)-b-2EHA-b-(CHMA/TSMA), (CHMA/DSMA)-b-BA-b-(CHMA/DSMA), (CHMA/DSMA)-b-EA-b-(CHMA/DSMA), (CHMA/DSMA)-b-(BA/EA/MEA)-b-(CHMA/DSMA), (CHMA/DSMA)-b-2EHA-b-(CHMA/DSMA), (IBMA/TSMA)-b-BA-b-(IBMA/TSMA), (IBMA/TSMA)-b-EA-b-(IBMA/TSMA), (IBMA/TSMA)-b-(BA/EA/MEA)-b-(IBMA/TSMA), (IBMA/TSMA)-b-2EHA-b-(IBMA/TSMA), (IBMA/DSMA)-b-BA-b-(IBMA/DSMA), (IBMA/DSMA)-b-EA-b-(IBMA/DSMA), (IBMA/DSMA)-b-(BA/EA/MEA)-b-(IBMA/DSMA), (IBMA/DSMA)-b-2EHA-b-(IBMA/DSMA), and the like.

Examples of a di-block polymer having a methacrylic acid include (MMA/MA)-b-BA, (MMA/MA)-b-EA, (MMA/MA)-b-(BA/EA/MEA), (MMA/MA)-b-2EHA, (IBMA/MA)-BA, (IBMA/MA)-b-EA, (IBMA/MA)-b-(BA/EA/MEA), (IBMA/MA)-b-2EHA, and the like.

Examples of a tri-block polymer having a methacrylic acid include (MMA/MA)-b-BA-b-(MMA/MA), (MMA/MA)-b-EA-b-(MMA/MA), (MMA/MA)-b-(BA/EA/MEA)-b-(MMA/MA), (MMA/MA)-b-2EHA-b-(MMA/MA), (CHMA/MA)-b-BA-b-(CHMA/MA), (CHMA/MA)-b-EA-b-(CHMA/MA), (CHMA/MA)-b-(BA/EA/MEA)-b-(CHMA/MA), (CHMA/MA)-b-2EHA-b-(CHMA/MA), (IBMA/MA)-b-BA-b-(IBMA/MA), (IBMA/MA)-b-EA-b-(IBMA/MA), (IBMA/MA)-b-(BA/EA/MEA)-b-(IBMA/MA), (IBMA/MA)-b-2EHA-b-(IBMA/MA), and the like.

Examples of a di-block polymer having an acid anhydride group include (MMA/MAH)-b-BA, (MMA/MAH)-b-EA, (MMA/MAH)-b-(BA/EA/MEA), (MMA/MAH)-b-2EHA, (IBMA/MAH)-BA, (IBMA/MAH)-b-EA, (IBMA/MAH)-b-(BA/EA/MEA), (IBMA/MAH)-b-2EHA, and the like.

Examples of a tri-block polymer having an acid anhydride group include (MMA/MAH)-b-BA-b-(MMA/MAH), (MMA/MAH)-b-EA-b-(MMA/MAH), (MMA/MAH)-b-(BA/EA/MEA)-b-(MMA/MAH), (MMA/MAH)-b-2EHA-b-(MMA/MAH), (CHMA/MAH)-b-BA-b-(CHMA/MAH), (CHMA/MAH)-b-EA-b-(CHMA/MAH), (CHMA/MAH)-b-(BA/EA/MEA)-b-(CHMA/MAH), (CHMA/MAH)-b-2EHA-b-(CHMA/MAH), (IBMA/MAH)-b-BA-b-(IBMA/MAH), (IBMA/MAH)-b-EA-b-(IBMA/MAH), (IBMA/MAH)-b-(BA/EA/MEA)-b-(IBMA/MAH), (IBMA/MAH)-b-2EHA-b-(IBMA/MAH), and the like.

Examples of a di-block polymer having a hydroxyl group include (MMA/HEMA)-b-BA, (MMA/HEMA)-b-EA, (MMA/HEMA)-b-(BA/EA/MEA), (MMA/HEMA)-b-2EHA, (IBMA/HEMA)-BA, (IBMA/HEMA)-b-EA, (IBMA/HEMA)-b-(BA/EA/MEA), (IBMA/HEMA)-b-2EHA, MMA-b-(BA/HEA), MMA-b-(EA/HEA), MMA-b-(BA/EA/MEA/HEA), MMA-b-(2EHA/HEA), IBMA-b-(BA/HEA), IBMA-b-(EA/HEA), IBMA-b-(BA/EA/MEA/HEA), IBMA-b-(2EHA/HEA), and the like.

Examples of a tri-block polymer having a hydroxyl group include (MMA/HEMA)-b-BA-b-(MMA/HEMA), (MMA/HEMA)-b-EA-b-(MMA/HEMA), (MMA/HEMA)-b-(BA/EA/MEA)-b-(MMA/HEMA), (MMA/HEMA)-b-2EHA-b-(MMA/HEMA), (CHMA/HEMA)-b-BA-b-(CHMA/HEMA), (IBMA/HEMA)-b-BA-b-(IBMA/HEMA), (IBMA/HEMA)-b-EA-b-(IBMA/HEMA), (IBMA/HEMA)-b-(BA/EA/MEA)-b-(IBMA/HEMA), (IBMA/HEMA)-b-2EHA-b-(IBMA/HEMA), MMA-b-(BA/HEA)-b-MMA, MMA-b-(EA/HEA)-b-MMA, MMA-b-(BA/EA/MEA/

HEA)-b-MMA, MMA-b-(2EHA/HEA)-b-MMA, IBMA-b-(BA/HEA)-b-IBMA, IBMA-b-(EA/HEA)-b-IBMA, IBMA-b-(BA/EA/MEA/HEA)-b-IBMA, IBMA-b-(2EHA/HEA)-b-IBMA, and the like.

The invention will be further described with reference to the following examples.

(1) The Case that Modification of Impact Resistance of Poly(Vinyl Chloride) Resin is Aimed It is preferable to add an epoxy group-containing acrylic block copolymer in an amount of 5 to 15 parts by weight relative to 100 parts by weight of poly(vinyl chloride) resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 70/30 (% by weight) and the epoxy content is preferably 0.1 to 5% as a weight ratio of GMA relative to the whole.

(2) The Case that Modification of Processability of Poly(Vinyl Chloride) Resin is Aimed It is preferable to add an epoxy group-containing acrylic block copolymer in an amount of 0.5 to 1.5 parts by weight relative to 100 parts by weight of poly(vinyl chloride) resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 60/40 (% by weight) and the epoxy content is preferably 0.1 to 5% as a weight ratio of GMA relative to the whole.

(3) The Case that Modification of Impact Resistance of Poly(Vinyl Chloride) Resin is Aimed with Maintaining Transparency Thereof It is preferable to add an epoxy group-containing acrylic block copolymer in an amount of 5 to 40 parts by weight relative to 100 parts by weight of poly(vinyl chloride) resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 40/60 (% by weight) and the epoxy content is preferably 0.1 to 5% as a weight ratio of GMA relative to the whole.

(4) The Case that Modification of Impact Resistance of Polycarbonate Resin is Aimed It is preferable to add an epoxy group-containing acrylic block copolymer in an amount of 5 to 20 parts by weight relative to 100 parts by weight of polycarbonate resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 60/40 (% by weight) and the epoxy content is preferably 0.1 to 10% as a weight ratio of GMA relative to the whole.

(5) The Case that Modification of Balance Between Flowability and Impact Resistance of Polybutylene Terephthalate Resin is Aimed It is preferable to add an epoxy group-containing acrylic block copolymer in an amount of 5 to 20 parts by weight relative to 100 parts by weight of polybutylene terephthalate resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 60/40 (% by weight) and the epoxy content is preferably 0.1 to 10% as a weight ratio of GMA relative to the whole.

(6) The Case that Modification of Impact Resistance of Polyethylene Terephthalate Resin is Aimed It is preferable to add an epoxy group-containing acrylic block copolymer in an amount of 5 to 20 parts by weight relative to 100 parts by weight of polyethylene terephthalate resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 60/40 (% by weight) and the epoxy content is preferably 0.1 to 10% as a weight ratio of GMA relative to the whole.

(7) The Case that Modification of Impact Resistance of PET-G Resin (Ethylene Terephthalate/Cyclohexanedimethylene Terephthalate Polymer) is Aimed with Maintaining Transparency Thereof.

It is preferable to add an epoxy group-containing acrylic block copolymer in an amount of 5 to 20 parts by weight relative to 100 parts by weight of PET-G resin. The epoxy group-containing acrylic block copolymer is preferably (MMA/GMA)-b-BA-b-(MMA/GMA) and its molecular weight is preferably 50,000 to 150,000. The composition of BA to MMA is preferably 80/20 to 60/40 (% by weight) and the epoxy content is preferably 0.1 to 20% as a weight ratio of GMA relative to the whole.

(8) The Case that Modification of Impact Resistance of Polyamide Resin is Aimed

It is preferable to add an acrylic block copolymer containing an epoxy group, a carboxyl group, or an acid anhydride group, in an amount of 5 to 20 parts by weight relative to 100 parts by weight of a polyamide resin. The acrylic block copolymer containing an epoxy group, a reactive functional group is preferably (MMA/GMA)-b-BA-b-(MMA/GMA), (MMA/MAH)-b-BA-b-(MMA/MAH), (MMA/MA)-b-BA-b-(MMA/MA) and its molecular weight is preferably 50,000 to 150,000. The composition of BA to MMA is preferably 80/20 to 60/40 (% by weight) and the epoxy content is preferably 0.1 to 20% as a weight ratio of GMA relative to the whole. With regard to the content of the functional group, number of the functional group is preferably 1 or more per molecule.

(8) The Case that Improvement of Melt Viscosity of Polyester Resin is Aimed

It is preferable to add an acrylic block copolymer containing an epoxy group, a carboxyl group, or an acid anhydride group as a reactive functional group, in an amount of 1 to 30 parts by weight relative to 100 parts by weight of a polyester resin. The acrylic block copolymer containing a reactive functional group is preferably (MMA/GMA)-b-BA-b-(MMA/GMA), (MMA/MAH)-b-BA-b-(MMA/MAH), (MMA/MA)-b-BA-b-(MMA/MA) and its molecular weight is preferably 50,000 to 150,000. The composition of BA to MMA is preferably 90/10 to 10/90 by weight). With regard to the content of the functional group, number of the functional group is preferably 2 or more per molecule. This blend is applicable for the purpose of easy molding by improving melt viscosity of the polyethylene terephthalate.

EXAMPLES

The following will describe the invention in further detail with reference to examples, but the invention is not limited only to these examples.

EA, BA, MEA, MMA, TSMA, DSMA, GMA, SMA, IBMA, 2EHA, HEA, TBMA, and MA in the examples mean ethyl acrylate, butyl acrylate, 2-methoxyethyl acrylate, methyl methacrylate, γ-(methacryloyloxypropyl)trimethoxysilane, γ-(methacryloyloxypropyl)dimethoxymethylsilane, glycidyl methacrylate, stearyl methacrylate, isobornyl methacrylate, 2-ethylhexyl acrylate, hydroxyethyl acrylate, tertiary-butyl acrylate, and methacrylic acid, respectively.

<Test Methods>

(Molecular Weight)

The molecular weight of the block copolymer was measured on a GPC analysis apparatus (system: a GPC system manufactured by Waters, column: Shodex K-804 (polystyrene gel) manufactured by Showa Denko K.K.). Using chloroform as a moving phase, a molecular weight calculated as polystyrene was determined.

(Percentage of Block Polymer)

Ethanol was used to separate a soluble portion from an insoluble portion, and the soluble portion was removed as homo-poly(acrylate ester). Next, a mixed solution of chloroform and methanol in a ratio of 15/85 (% by weight) was used to separate a soluble portion from an insoluble portion, and the insoluble portion was removed as homo-poly(methacrylate ester), e.g., homo-poly(methyl methacrylate). The remaining soluble portion was regarded as a block copolymer, and weight percentage thereof was determined as the percentage of block polymer.

(Composition)

Weight percentages of poly(acrylate ester) and poly(methacrylate ester) in the block copolymer were confirmed by $^1$H-NMR. In the case that the method is not applicable, a method of determining the percentage based on the weights of charged monomers and consumption of the monomers on a gas chromatograph is applied.

<Production of Block Copolymers>

Production Example 1

(Synthesis of MMA-BA-MMA Type Block Copolymer)

To a 50 L reactor was charged 112.56 g of copper(I) bromide, and the atmosphere in the reactor was replaced by nitrogen. A solution obtained by previously mixing 627.44 g of acetonitrile and 1072.8 g of butyl acrylate was charged to the reactor inside of which was maintained under a reduced pressure, followed by elevation of the temperature to 65° C. and stirring for 30 minutes. Thereafter, a solution obtained by dissolving 56.50 g of diethyl 2,5-dibromoadipate in 6973.2 g of butyl acrylate and 158.76 g of butyl acetate, and 784.30 g of acetonitrile were charged thereto, followed by elevation of the temperature to 85° C. and stirring for further 30 minutes. Polymerization of butyl acrylate to be a first block was initiated by adding 16 ml of pentamethyldiethylenetriamine.

When the conversion reached 95%, 14228.8 g of toluene, 77.68 g of copper(I) chloride, and 5182.5 g of methyl methacrylate were charged thereto, and polymerization of methyl methacrylate to be a second block was initiated by adding 16 ml of pentamethyldiethylenetriamine. When the conversion reached 56%, 8660 g of toluene was added to dilute the reaction solution and at the same time, the reactor was cooled to terminate the polymerization.

Upon GPC analysis of the resulting block copolymer, number average molecular weight Mn was 107,000 and molecular weight distribution Mw/Mn was 1.46. Moreover, upon composition analysis by NMR, MMA/BA was 29/71 (% by weight).

A polymer concentration was diluted to 14.6% by weight by adding toluene to the resulting block copolymer solution, and 32 g of p-toluenesulfonic acid was added thereto. Then, the atmosphere in the reactor was replaced by nitrogen and the whole was stirred at room temperature for 3 hours. After the reaction liquid was sampled and the solution was confirmed to be colorless and transparent, the reaction was terminated. Thereafter, the solution was discharged and a solid mass was removed by means of a separation panel-type centrifuge.

To 50 L of the block copolymer solution was added 150 g of KYOWARD 500SH, then the atmosphere in the reactor was replaced by nitrogen and the whole was stirred at room temperature for 3 hours. After the reaction liquid was sampled and the solution was confirmed to be neutral, the reaction was terminated. Thereafter, the solution was discharged and a solid-liquid separation was performed to remove the adsorbent.

The above polymer solution was fed to a horizontal evaporator equipped with a vent and the solvent and the unreacted monomers were evaporated, whereby a polymer was isolated. The temperature of body jacket and screw of the evaporator was regulated to 200° C. with a heating medium and inside of the evaporator was maintained under a reduced pressure of about 0.01 MPa or lower by means of a vacuum pump. The resulting resin was pelletized by means of an underwater cut-type pelletizer. An extruder had a single screw and a screw diameter of 50 mm, and was operated at 160° C. and at a resin-feeding rate of 12 kg/hour. The die part had an aperture diameter of 2.4 mm and double apertures, and a cutter with four blades was used. Stearic acid amide was added in an amount of 0.3% by weight into circulating cooling water and the treatment was performed with the circulating cooling water at a flow rate of 260 L/minute and at a set temperature of 34° C. at a heat exchanger exit. From the apparatus, spherical pellets (M-1) having a diameter of about 3 mm were obtained.

Production Example 2

Synthesis of (MMA-co-GMA)-b-BA-b-(MMA-co-GMA) Type Block Copolymer (also Referred to as Epoxy Group-Containing MMA-BA-MMA Type Block Copolymer)

After inside of a polymerization vessel of a 500 mL separable flask was replaced by nitrogen, 1.32 g (9.2 mmol) of copper bromide (copper(I) bromide, the same shall apply hereinafter) was weighed into the vessel and 20 mL of acetonitrile (dried over molecular sieves and then bubbled with nitrogen) was added thereto. After heated under stirring at 70° C. for 5 minutes, the whole was cooled to room temperature and 0.63 g (1.7 mmol) of an initiator, diethyl 2,5-dibromoadipate, and 89.4 g (100 mL) of BA were added thereto. After the mixture was heated under stirring at 80° C., a catalyst was formed in the system by adding 0.19 mL (0.9 mmol) of a ligand, pentadiethylenetriamine (hereinafter, abbreviated as triamine) thereto to initiate polymerization. Every a certain period of time, e.g., 30 minutes from the initiation of polymerization, about 0.2 mL of the polymerization solution was sampled and conversion of BA was determined by gas chromatographic analysis of the sampled solution. When the rate of increase of the determined conversion is lower than the desired rate, the polymerization rate was regulated by adding the triamine as needed to form the catalyst in the system.

At the time when conversion of BA reached 88% (after 5 hours), 69.8 g (74.6 mL) of MMA, 5.0 g (4.8 mL) of GMA, 1.82 g (18.5 mmol) of copper chloride (copper(I) chloride, the same shall apply hereinafter), 0.19 mL (0.9 mmol) of the triamine, and 82.9 mL of toluene (dried over molecular sieves and then bubbled with nitrogen) were added all at once.

Upon GPC analysis of the sample immediately after the addition, number average molecular weight Mn was 55,600 and molecular weight distribution Mw/Mn was 1.13.

Similarly, conversion of MMA was determined.

At the time when conversion of BA was 90%, conversion of MMA was 37%, and conversion of GMA was 47% (after 0.5 hour), 500 mL of toluene was added and the reactor was cooled in a water bath to terminate the reaction.

The reaction solution was filtrated through active alumina and thereby the copper complex was removed. The solvent was removed from the filtrate by evaporation under reduced pressure and the resulting polymer was vacuum dried at 60° C. for 24 hours, whereby an aimed block copolymer (M-2) was obtained.

Upon GPC analysis of the resulting block copolymer, number average molecular weight Mn was 863,000 and molecular weight distribution Mw/Mn was 1.43. Moreover, upon composition analysis by NMR, the ratio of BA/MMA/GMA was 72/26/2 (% by weight). Blocking percentage was 74% by weight and homo-PMMA was not detected.

In a similar manner to Production Example 1, an epoxy group-containing MMA-BA-MMA type block copolymer (M-2') was synthesized, which had a number average molecular weight Mn of 100,800, a molecular distribution Mw/Mn of 1.46, and a composition of BA/MMA/GMA of 73/26/1 (% by weight).

Production Example 3

Synthesis of MMA-BA-MMA Type Block Copolymer (Hereinafter, Abbreviated as M3AM)

To a 50 L reactor was charged 123.10 g of copper(I) bromide, the atmosphere in the reactor was replaced by nitrogen. A solution obtained by previously mixing 627.44 g of acetonitrile and 1072.8 g of butyl acrylate was charged to the reactor inside of which was maintained under a reduced pressure, followed by elevation of the temperature to 65° C. and stirring for 30 minutes. Thereafter, a solution obtained by dissolving 61.79 g of diethyl 2,5-dibromoadipate in 2160.7 g of butyl acrylate, 3175.3 g of ethyl acrylate, 1970.0 g of 2-methoxyethyl acrylate, and 158.76 g of butyl acetate, and 784.30 g of acetonitrile were charged thereto, followed by elevation of the temperature to 85° C. and stirring for further 30 minutes.

Polymerization of butyl acrylate/ethyl acrylate/2-methoxyethyl acrylate to be a first block was initiated by adding 18 ml of pentamethyldiethylenetriamine.

When the conversion reached 96%, 14948 g of toluene, 84.95 g of copper(I) chloride, and 5385.5 g of methyl methacrylate were charged thereto and polymerization of methyl methacrylate to be a second block was initiated by adding 18 ml of pentamethyldiethylenetriamine. When the conversion reached 58%, 8660 g of toluene was added to dilute the reaction solution and at the same time, the reactor was cooled to terminate the polymerization. Upon GPC analysis of the resulting block copolymer, number average molecular weight Mn was 111,800 and molecular weight distribution Mw/Mn was 1.48. Moreover, upon composition analysis by NMR, the ratio of MMA/BA/EA/MEA was 28/28/27/17 (% by weight). A polymer concentration was diluted to 14.6% by weight by adding toluene to the resulting block copolymer solution, and 196 g of p-toluenesulfonic acid was added thereto. Then, the atmosphere in the reactor was replaced by nitrogen and the whole was stirred at room temperature for 3 hours. After the reaction liquid was sampled and the solution was confirmed to be colorless and transparent, the reaction was terminated. Thereafter, the solution was discharged and a solid-liquid separation was performed to remove a solid mass. To 50 L of the block copolymer solution was added 150 g of Kyowad 500SH, then the atmosphere in the reactor was replaced by nitrogen and the whole was stirred at room temperature for 3 hours. After the reaction liquid was sampled and the solution was confirmed to be neutral, the reaction was terminated. Thereafter, the solution was discharged and a solid-liquid separation was performed to remove the adsorbent.

Thus, an aimed block copolymer (M-3) was obtained.

Production Example 4

Synthesis of MMA-b-(BA-co-HEA)-b-MMA Type Block Copolymer (Hereinafter, Abbreviated as MHBAM)

After inside of a polymerization vessel of a 5 L separable flask was replaced by nitrogen, 11.6 g (80.7 mmol) of copper bromide was weighed in the vessel and 180 mL of acetonitrile (bubbled with nitrogen) was added thereto. After the whole was heated under stirring at 70° C. for 30 minutes, 5.8 g (16.1 mmol) of an initiator, diethyl 2,5-dibromoadipate, 832.5 mL (5.8 mol) of BA, and 67.5 mL (0.65 mol) of HEA were added thereto. After the mixture was heated under stirring at 85° C., 1.68 mL (8.1 mmol) of a ligand, pentadiethylenetriamine was added thereto to initiate polymerization. Every a certain period of time from the initiation of polymerization, about 0.2 mL of the polymerization solution was sampled and conversions of BA and HEA were determined by gas chromatographic analysis of the sampled solution. The polymerization rate was regulated by adding the triamine as needed. At the time when conversion of BA reached 94% and conversion of HEA reached 97%, 558.8 mL (75.2 mol) of MMA, 8.0 g (80.7 mmol) of copper chloride, 1.68 mL (8.1 mmol) of diethylenetriamine, and 1105 mL of toluene (bubbled with nitrogen) were added. At the time when conversion of MMA was 63% and conversion of BA was 97%, 1300 mL of toluene was added and the reactor was cooled in a water bath to terminate the reaction.

The reaction solution was diluted with 5 L of toluene and 18.4 g of p-toluenesulfonic acid monohydrate was added thereto, followed by stirring at room temperature for 3 hours. After the precipitated insoluble portion was removed by filtration through a Kiriyama funnel, an adsorbent Kyowad 500SH was added, followed by stirring at room temperature for further 3 hours. The adsorbent was filtrated off through a Kiriyama funnel to obtain a colorless transparent polymer solution. The solution was dried to remove the solvent and the remaining monomers, whereby an aimed block copolymer (M-4) was obtained.

Upon GPC analysis of the resulting block copolymer, number average molecular weight Mn was 118,400 and molecular weight distribution Mw/Mn was 1.69. The composition ratio of BA/HEA/MMA measured from conversion on gas chromatographic analysis was 65/7/28 (% by weight)

Production Example 5

Synthesis of (MMA-co-TBMA)-b-BA-b-(MMA-co-TBMA) Type Block Copolymer and Functional Group-Converting Reaction After inside of a polymerization vessel of a 5 L separable flask was replaced by nitrogen, 11.6 g (80.7 mmol) of copper bromide was weighed in the vessel and 180 mL of acetonitrile (bubbled with nitrogen) was added thereto. After the whole was heated under stirring at 70° C. for 30 minutes, 5.65 g (15.7 mmol) of an initiator, diethyl 2,5-dibromoadipate and 900 mL (6.28 mol) of BA were added thereto. After the mixture was heated under stirring at 85° C., 1.64 mL (7.9 mmol) of a ligand, pentadiethylenetriamine was added thereto to initiate polymerization. Every a certain period of time from the initiation of polymerization, about 0.2 mL of the polymerization solution was sampled and conversion of BA was determined by gas chromatographic analysis of the sampled solution. The polymerization rate was regulated by adding the triamine as needed. At the time when conversion of BA reached 95%, 234 mL (1.44 mol) of TBMA and 154 mL of MMA were added. Similarly, conversions of TBMA and MMA were determined. At the time when conversion of TBMA was 89% and conversion of MMA was 84%, 1300 mL of toluene was added and the reactor was cooled in a water bath to terminate the reaction. The reaction solution was diluted with 5.0 L of toluene and 26.9 g of p-toluenesulfonic acid monohydrate was added thereto, followed by stirring at room temperature for 3 hours. After the precipitated insoluble portion was removed by filtration through a Kiriyama funnel, 12.0 g of an adsorbent Kyowad 500SH (manufactured by Kyowa Kagaku K.K.) was added, followed by stirring at room temperature for further 3 hours. The adsorbent was filtrated off through a Kiriyama funnel to obtain a colorless transparent polymer solution. The solution was dried to remove the solvent and the remaining monomers, whereby an aimed block copolymer (M-5) was obtained.

Upon GPC analysis of the resulting block copolymer, number average molecular weight Mn was 113,600 and molecular weight distribution Mw/Mn was 1.44. The composition ratio of BA/MMA/TBMA measured from conversion on gas chromatographic analysis was 72/11/17 (% by weight).

In 1.0 L of toluene was dissolved 100 g of the resulting block copolymer (M-5), and 3.0 g of p-toluenesulfonic acid monohydrate was added thereto. The whole was heated under stirring on an oil bath of 120° C. for 3 hours to convert a t-butyl ester into a carboxyl group. The mixture was diluted with methanol and 2.0 g of Kyowad 500SH was added thereto, followed by stirring. Then, it was removed by filtration and the filtrate was vacuum dried at 80° C. to obtain an aimed carboxyl group-containing block copolymer.

The conversion of t-butyl ester site into a carboxyl group could be confirmed by IR (infrared absorption spectrum) and $^{13}$C-NMR (nuclear magnetic resonance spectrum). That is, in IR, it was confirmed by the appearance of a broad absorption spectrum derived from the carboxyl group at around 3400 to 3000 cm$^{-1}$ after the conversion. In $^{13}$C-NMR, it was confirmed by the disappearance of a signal at 82 ppm derived from methine carbon of the t-butyl group and a signal at 28 ppm derived from methyl carbon.

In a similar manner to Production Example 5, an (MMA-co-TBMA)-b-BA-b-(MMA-co-TBMA) block copolymer (M-5') was synthesized, which had a number average molecular weight Mn of 122,900, a molecular distribution Mw/Mn of 1.46, and a composition of TBMA/MMA/BA of 8.3/21.6/70.1 (% by weight).

Production Example 6

Production of a Block Copolymer Having an Acid Anhydride Group in a Hard Segment An (MMA-co-TBMA)-b-BA-b-(MMA-co-TBMA) block copolymer produced according to Production Example 5 was kneaded in a plastomill for 20 minutes at a set temperature of 240° C. and a revolution number of 100 times/minute to obtain an aimed acid anhydride-type block copolymer (M-7). The conversion of t-butyl ester site into the carboxylic acid anhydride was confirmed by IR (infrared absorption spectrum) and $^{13}$C-NMR (nuclear magnetic resonance spectrum). That is, in IR, it was confirmed by the appearance of an absorption spectrum derived from the acid anhydride at around 1800 cm$^{-1}$ after the conversion. In $^{13}$C-NMR, it was confirmed by the disappearance of a signal at 82 ppm derived from methine carbon of the t-butyl group and a signal at 28 ppm derived from methyl carbon.

<Production of Thermoplastic Resin Composition>

(3) Examples 1 to 31 and Comparative Examples 1 to 15

(Hardness)

Hardness at 23° C. (JIS A or JIS D) was measured in accordance with JIS K6253.

(Tensile Strength at Break and Tensile Elongation at Break)

Tensile elongation at 23° C. was measured in accordance with JIS K6251. The elongation was a distance between chucks, the distance was 20 mm, and tensile rate was 200 or 500 mm/minutes.

(Oil Resistance)

With regard to oil resistance at 70° C., a sample piece was immersed in a transformer oil B at 70° C. for 4 hours and weight change percentage before and after the test was measured in accordance with JIS C232. With regard to oil resistance at 150° C., a sample piece was immersed in an IRM903 oil at 150° C. for 70 hours and weight change percentage before and after the test was measured in accordance with ASTM D638.

(Vicat Softening Point)

In accordance with JIS K7206, a sample piece cut into a 2 cm square was immersed in a silicone oil previously kept at 50° C. and the point was measured using a weight of 1 kg. The temperature-elevating rate was 50° C./hour.

(Flow Property)

A resin (1.25 g) was heated at a rate of 6° C./min from 80° C. with a load of 60 kgf using a die of 1 mm×10 mm and a temperature at which flowing was started and a temperature at which flowing was finished were measured.

(Observation on Transmission Electron Microscope)

An ultra-thin slice cut with a microtome from a portion to be observed of a molded article was stained with an oxidizing agent such as RuO$_4$ and then observed on a transmission electron microscope.

Example 1

A polybutylene terephthalate resin (Duranex 2002, manufactured by Polyplastics Co., Ltd.) (hereinafter, also referred to as PBT resin) as a crystalline thermoplastic resin and the MMA-BA-MMA-type block copolymer (M-1) as a block copolymer were blended so as to be 100 parts by weight in total. A mixture obtained by further adding 0.3 part by weight of Topanol CA-SF (manufactured by REPRE Topanol K.K.) as a stabilizer and 0.3 part by weight of PEP-36 (manufactured by Asahi Denka Kogyo K.K.) thereto was kneaded in a plastomill at a set temperature of 240° C. and a revolution number of 50 times/minute for 5 minutes to obtain a clumpy sample. The resulting sample was molded on a hot press at a set temperature of 240° C. to obtain a molded article having a thickness of 2 mm for evaluating physical properties.

After the resulting molded article was punched or cut into individual predetermined shapes, physical properties of the resulting molded article were measured according to the above methods.

Example 2

A molded article was prepared and evaluated in a similar manner to Example 1 with the exception that the MMA-(EA/BA/MEA)-MMA type block copolymer (M-3) was used as the block copolymer in Example 1.

Comparative Example 1

A molded article was prepared and evaluated in a similar manner to Example 1 with the exception that no block copolymer was added in Example 1. However, since the molded article is too hard, a dumbbell for the tensile test could not be punched out.

Example 3

A molded article was prepared and evaluated in a similar manner to Example 1 with the exception that a nylon 6 resin (UBE Nylon 1013B, manufactured by Ube Industries, Ltd.) (hereinafter, also referred to as PA resin) was used as a crystalline thermoplastic resin and further 0.2 part by weight of AO-80 (manufactured by Asahi Denka Kogyo K.K.) as a stabilizer and 0.5 part by weight of TPS (manufactured by Sumitomo Chemical Co., Ltd.) were used.

Example 4

A molded article was prepared and evaluated in a similar manner to Example 3 with the exception that the MMA-(EA/BA/MEA)-MMA type block copolymer (M-3) was used as the block copolymer in Example 3.

Example 5

A molded article was prepared and evaluated in a similar manner to Example 4 with the exception that 0.5 part by weight of carbon black (Carbon black 35, manufactured by Mitsubishi Chemical Corporation) was further added in Example 4.

Comparative Example 2

A molded article was prepared and evaluated in a similar manner to Example 3 with the exception that no block copolymer was added in Example 1. However, since the molded article is too hard, a dumbbell for the tensile test could not be punched out.

Comparative Example 3

An ester-based elastomer, PELPRENE P46D01 (manufactured by Toyobo Co., Ltd.) was kneaded in a plastomill at a set temperature of 220° C. and a revolution number of 50 times/minute for 5 minutes to obtain a clumpy sample. A molded article was prepared and evaluated in a similar manner to Example 1 with the exception that the resulting sample was molded on a hot press at a set temperature of 220° C.

Comparative Example 4

A molded article was prepared and evaluated in a similar manner to Comparative Example 3 with the exception that an amide-based elastomer DAIAMIDE E47-S1 (manufactured by DAICEL-Huels Ltd.) was used.

Comparative Example 5

A urethane-based elastomer, Elastollan PC90A10 (manufactured by BASF Polyurethane) was kneaded in a plastomill at a set temperature of 210° C. and a revolution number of 50 times/minute for 5 minutes to obtain a clumpy sample. A molded article was prepared and evaluated in a similar manner to Example 1 with the exception that the resulting sample was molded on a hot press at a set temperature of 210° C.

The evaluation results are shown in Table 1.

TABLE 1

| | Blend content | | | | Vicat | Oil resistance | | Hardness | | Tensile properties | |
|---|---|---|---|---|---|---|---|---|---|---|---|
| | | | | | | 70° C. | 150° C. | JISD | | Strength | Elongation |
| | Resin | part | Block polymer | part | 1 kg 1 mm/ 2 mm | 4 hr Degree of swelling | 72 hr Shape | Immediately after | 15 sec | at break MPa | at break % |
| Example 1 | PBT | 33 | MBAM | 67 | trans-fixed | 5.2% | 34.2% dissolved | 23 | 15 | 4.5 | 151 |
| | PBT | 40 | MBAM | 60 | trans-fixed | 4.7% | −18.1% partially dissolved | 35 | 21 | 5.0 | 76 |
| | PBT | 50 | MBAM | 50 | 102 | 3.0% | −1.6% partially dissolved | 50 | 39 | 9.6 | 31 |

TABLE 1-continued

| | Blend content | | | | Vicat | Oil resistance 70° C. 1 kg 4 hr | | Oil resistance 150° C. 72 hr | | Hardness JISD | | Tensile properties | |
|---|---|---|---|---|---|---|---|---|---|---|---|---|---|
| | Resin | part | Block polymer | part | 1 mm/ 2 mm | Degree of swelling | Shape | Degree of swelling | Shape | Immediately after | 15 sec | Strength at break MPa | Elongation at break % |
| | PBT | 67 | MBAM | 33 | 208 | 0.2% | | 1.2% | original shape exists | 63 | 55 | 20.6 | 15 |
| Example 2 | PBT | 33 | M3AM | 67 | trans-fixed | 0.7% | | 5.2% | deformed | 41 | 25 | 3.5 | 81 |
| | PBT | 40 | M3AM | 60 | 212 | 0.6% | | 5.0% | partially deformed | 56 | 44 | 8.0 | 23 |
| | PBT | 50 | M3AM | 50 | 210 | 0.6% | | 4.3% | partially deformed | 57 | 47 | 8.7 | 14 |
| | PBT | 67 | M3AM | 33 | 207 | 0.2% | | 1.8% | original shape existed | 57–71 | 45–65 | 18.8 | 6 |
| Comparative Example 1 | PBT | 100 | — | | 211 | 0.0% | | 0.5% | original shape existed | 83 | 81 | — | |
| Example 3 | PA | 40 | MBAM | 60 | 77 | 3.0% | | −0.6% | partially dissolved | 46 | 31 | 8.9 | 75 |
| | PA | 50 | MBAM | 50 | 185 | 1.7% | | −2.6% | partially dissolved | 55 | 41 | 11.6 | 64 |
| Example 4 | PA | 40 | M3AM | 60 | 201 | 0.6% | | 3.0% | original shape existed | 56 | 42 | 8.7 | 90 |
| | PA | 50 | M3AM | 50 | 202 | 0.2% | | 3.5% | original shape existed | 66 | 57 | 12.8 | 51 |
| Example 5 | PA | 40 | M3AM | 60 | 200 | 0.4% | | 4.3% | original shape existed | 58 | 46 | 11.6 | 84 |
| | PA | 50 | M3AM | 50 | 199 | 0.2% | | 4.6% | original shape existed | 65 | 54 | 12.9 | 52 |
| Comparative Example 2 | PA | 100 | — | | 214 | 0.0% | | 0.1% | original shape existed | 84 | 81 | — | |
| Comparative Example 3 | TPEE | 100 | — | | 165 | 4.1% | | 7.8% | original shape existed | 46 | 42 | 34.9 | 721 |
| Comparative Example 4 | TPAE | 100 | — | | 136 | 1.9% | | 7.9% | blackened | 52 | 45 | 30.4 | 618 |
| Comparative Example 5 | TPU | 100 | — | | 138 | 0.3% | | 2.4% | original shape existed | 49 | 43 | 50.7 | 836 |

From the results of Examples 1, 2, 3, and 4 and Comparative Examples 1 and 2, it is understood that the compositions of the invention exhibit elastomer-like properties with lowered hardness and a good oil resistance with maintaining a good thermal resistance, as compared with a crystalline resin alone. Moreover, from Comparative Examples 3, 4, and 5, it is understood that the compositions are superior in thermal resistance to an engineering plastic-based elastomer.

Furthermore, from Example 1, when the total of PBT and MBAM is 100 parts by weight, it is understood that PBT is preferably more than 40% by weight, more preferably 50 parts by weight, from the viewpoints of thermal resistance and oil resistance.

From Example 2, when the total of PBT and M3AM is 100 parts by weight, PBT is preferably more than 33% by weight, more preferably 40 parts by weight, from the viewpoints of thermal resistance and oil resistance.

From Example 3, when the total of PA and MBAM is 100 parts by weight, it is understood that PA is preferably more than 40% by weight, more preferably 50 parts by weight, from the viewpoints of thermal resistance and oil resistance.

From Examples 4 and 5, when the total of PA and M3AM is 100 parts by weight, PA is preferably more than 40% by weight, from the viewpoints of thermal resistance and oil resistance. Also, even when carbon black is blended, the physical properties are found to be satisfactory.

Example 6

With a 50 parts by weight of polybutylene terephthalate resin (DURANEX 2002, manufactured by Polyplastics Co., Ltd.) as a crystalline thermoplastic resin was blended 50 parts by weight of the MMA-BA-MMA-type block copolymer (M-1). The mixture was extruded and kneaded at a set temperature of 240° C. using a twin-screw extruder equipped with a vent (32 mm, L/D=25.5) and then subjected to extrusion molding with a circular die to obtain a strand. Appearance evaluation and tensile test of the strand were performed.

Example 7

A molded article was prepared and evaluated in a similar manner Example 6 with the exception that a nylon 6 resin (UBE Nylon 1013B, manufactured by Ube Industries, Ltd.) was used as the resin in Example 6.

The evaluation results are shown in Table 2.

TABLE 2

Tensile Test of Strand (200 mm/min)

| Experimental No. | Blend content | | | | Broken site | Tensile properties (flow direction) | | | Modulus of elasticity MPa |
|---|---|---|---|---|---|---|---|---|---|
| | Resin 1 | g | Resin 2 | g | | Strength at break MPa | Elongation at break % | Between marker % | |
| Example 6 | PBT | 50 | MBAM | 50 | Out of marker | 4.4 | 70 | 69 | 3.4 |
| Example 7 | PA | 50 | MBAM | 50 | Out of marker | 5.5 | 52 | 46 | 5.7 |

When these strands were pressed on a metal surface of SUS316 by hand and then released, no component attaching to the metal surface was confirmed.

Upon analysis of dispersion state inside of these strands by a transmission electron microscope, it was found that the strands had an island-sea structure wherein resins of about 1 micrometer were floated in a sea of the block polymer.

Thus, although a rubber component is about 35 parts of 100 parts of the composition, each strand is excellent in flexibility, cleanness, and good surface properties and further exhibits a feature that it is flexible but becomes hard when drawn. The materials may be preferably used in applications requiring flexibility and strength, such as horse materials, medical materials, and the like and in applications requiring that no residue remains on a contact surface of a metal, such as an adhesive for use in a conveyance apparatus of semi-conductor wafers.

Examples 8 to 13

Molded articles were prepared and evaluated in a similar manner to Example 1 with the exception that a polybutylene terephthalate resin (DURANEX 2002, manufactured by Polyplastics Co., Ltd.), UBE Nylon 1013B (manufactured by Ube Industries, Ltd.), or UBESTA (manufactured by Ube Industries, Ltd.) as a crystalline thermoplastic resin and, in Examples, the MMA-BA-MMA type block copolymer (M-1) or the MMA-(EA/BA/MEA)-MMA type block copolymer (M-3) as a block copolymer were blended according to the following Table.

TABLE 3

| | Example 8 | Example 9 | Example 10 | Example 11 | Example 12 | Example 13 |
|---|---|---|---|---|---|---|
| Resin | | | | | | |
| PBT DURANEX 2002 (g) | 7.5 | 7.5 | | | | |
| PA6 UBE 1013B (g) | | | 7.5 | 7.5 | | |
| PA12 UBE STA 3024U (g) | | | | | 7.5 | 7.5 |
| Block | | | | | | |
| MMA-BA-MMA (g) | 37.5 | | 37.5 | | 37.5 | |
| MMA-(BA/EA/MEA)-MMA (g) | | 37.5 | | 37.5 | | 37.5 |
| Stabilizer | | | | | | |
| Irganox 1010 (g) | 0.2 | 0.2 | 0.2 | 0.2 | 0.2 | 0.2 |
| Topanol CASF (g) | | | | | | |
| PEP-36 (g) | | | | 0.23 | | |
| AO80 (g) | | | | | | |
| TPS (g) | | | | | | |
| Physical properties | | | | | | |
| Hardness A | 39 | 64 | 40 | 61 | 43 | 64 |
| Hardness D | | 23 | | 21 | 17 | 23 |
| Strength at break (MPa) | 6.3 | 7.1 | 5.1 | 7.2 | 7 | 5.6 |
| Elongation at break between markers (%) | 197 | 272 | 255 | 289 | 209 | 345 |

TABLE 3-continued

|  | Example 8 | Example 9 | Example 10 | Example 11 | Example 12 | Example 13 |
|---|---|---|---|---|---|---|
| 150° C. oil resistance Degree of swelling (%) | −22.6 | 23.8 | −97.9 | 21.7 | 88.4 | 23.2 |
| Cset 70° C. 22 hours (%) | 42.2 | 58.9 | 67.5 | 74.6 | 45.8 | 70.5 |

Thus, it was found that a composition flexible and excellent in tensile properties was obtained by blending a block copolymer in an amount more than that of a resin. In particular, oil resistance is found to be excellent in the case that M-3 is used as a block copolymer.

Examples 14 to 20

Molded articles were prepared and evaluated in a similar manner to Example 1 with the exception that the epoxy group-containing MMA-BA-MMA type block copolymer (M-2) was used as a block copolymer and was blended according to the following Table.

press at a set temperature of 230° C. to obtain a molded article having a thickness of 2 mm for evaluating physical properties.

The resulting molded article was punched or cut into individual predetermined shapes, and physical properties of the resulting molded article were measured according to the above methods.

Compression set was measured according to the following method.

(Compression Set)

With regard to the compression set of the composition, in accordance with JIS K6301, a cylindrical molded article was

TABLE 4

|  | Example 14 | Example 15 | Example 16 | Example 17 | Example 18 | Example 19 | Example 20 |
|---|---|---|---|---|---|---|---|
| Resin |  |  |  |  |  |  |  |
| PBT DURANEX 2002 (g) | 7.5 |  |  | 21 |  | 28 |  |
| PA6 UBE 1013B (g) |  | 7.5 |  |  | 21 |  | 28 |
| PA12 UBE STA 3024U (g) |  |  | 7.5 |  |  |  |  |
| Block |  |  |  |  |  |  |  |
| (MMA/GMA)-BA-(MMA/GMA) (g) | 37.5 | 37.5 | 37.5 | 21 | 21 | 14 | 14 |
| Stabilizer |  |  |  |  |  |  |  |
| Irganox 1010 (g) | 0.2 | 0.2 | 0.2 |  |  |  |  |
| Topanol CASF (g) |  |  |  | 0.126 |  | 0.126 |  |
| PEP-36 (g) |  |  |  | 0.126 |  | 0.126 |  |
| AO80 (g) |  |  |  |  | 0.084 |  | 0.084 |
| TPS (g) |  |  |  |  | 0.21 |  | 0.21 |
| Physical properties |  |  |  |  |  |  |  |
| Hardness A | 59 | 28 | 35 |  |  |  |  |
| Hardness D | 13 |  |  | 24 | 26 | 35 | 37 |
| Strength at break (MPa) | 4 | 3.5 | 2.4 | 3.2 | 2.9 | 1.6 | collapsed |
| Elongation at break between markers (%) | 103 | 207 | 115 | 75 | 68 | 25 | collapsed |
| 150° C. oil resistance Degree of swelling (%) | 107.9 | 53.2 | 58 | 55.8 | 26.5 | 22 | 11.9 |
| Cset 70° C. 22 hours (%) | 53.2 | 31.3 | 36.9 | — | — | — | — |

Thus, it was found that molded articles more flexible than those in the case of using M-1 was obtained by using the epoxy group-containing MMA-BA-MMA type block copolymer.

Examples 21 to 22

Each mixture obtained by blending a nylon 6 (UBE Nylon, manufactured by Ube Industries, Ltd.) as a crystalline thermoplastic resin and the (MMA/MA)-BA-(MMA/MA) type block copolymer (M-6) as a block copolymer in the ratio shown in the following table was kneaded in a plastomill at a set temperature of 230° C. and a revolution number of 100 times/minute for 15 minutes to obtain a clumpy sample. The resulting sample was molded on a hot kept at 70° C. for 22 hours under a condition of compression ratio of 25% and left on standing at room temperature for 30 minutes. Then, the thickness of the molded article was measured and a residual degree of strain was calculated. That is, a compression set of 0% corresponds to the state that all the strain is restored and a compression set of 100% to the state that strain is not restored at all.

Example 23

A molded article was prepared and evaluated in a similar manner to Example 21 with the exception that the MMA-(BA/HEA)-MMA type block copolymer (M-4) was used as the block copolymer in Example 21.

The evaluation results are shown in Table 5.

TABLE 5

| | Blend content | | | | | Processing Temperature °C. | Hardness JIS A Immediately after | Hardness JIS D Immediately after |
|---|---|---|---|---|---|---|---|---|
| | Resin 1 | part | Resin 2 | part | Resin 3 | part | | |
| Example 21 | PA | 7.5 g | M-6 | 37.5 g | Ti(OBu)4 | 100 µl | 230 | |
| Example 22 | PA | 6 g | M-6 | 30 g | | | 230 | 29 |
| Example 23 | PA | 7.5 g | M-4 | 25 g | | | 230 | 45 |

| | Tensile properties | | Oil resistance 150° C. 72 hr | | Compression set | | Flow property | |
|---|---|---|---|---|---|---|---|---|
| | Strength at break MPa | Elongation at break % | Weight increase % | Shape | 70° C. 22 h % | 100° C. 22 h % | Start of flow ° C. | Finish of flow ° C. |
| Example 21 | 3.01 | 158.8 | 24.1 | partially collapsed | 68.6 | | 84.4 | 113.6 |
| Example 22 | 2.42 | 142.8 | 12.1 | partially collapsed | 84.5 | | | |
| Example 23 | 1.92 | 113.8 | 41.4 | almost maintained | 55.1 | | | |

Flow Property: 60 kg-load

Thus, it was found that flexible molded articles was obtained. Upon the observation of appearance, since the melting point of the nylon 6 is not observed on DSC, it is understood that the nylon 6 has reacted with the carboxylic acid-containing MMA-BA-MMA type block copolymer. Moreover, these compositions are suitably usable as compatibility enhancers.

(DSC: Measurement of differential scanning calorimetry) Using DSC-50 (manufactured by Shimadzu Corporation), 2 mg of a sample was heated to 300° C. at an elevation rate of 20° C./minute under a nitrogen stream.

Example 24

Hundred parts by weight of the (MMA-co-TBMA)-b-BA-b-(MMA-co-TBMA) block copolymer (M-5') having a number average molecular weight Mn of 122,900, a molecular weight distribution Mw/Mn of 1.46 and a composition of TBMA/MMA/BA=8.3/21.6/70.1 was kneaded in a plastomill at a set temperature of 240° C. and a revolution number of 100 times/minute for 20 minutes to convert it into an acid anhydride type block copolymer (M-7').

A mixture obtained by adding 100 parts by weight of a polybutylene terephthalate resin (Duranex 2002, manufactured by Polyplastics Co., Ltd.) thereto was kneaded in a plastomill at a set temperature of 240° C. and a revolution number of 100 times/minute for 20 minutes to obtain a clumpy sample. The resulting sample was molded on a hot press at a set temperature of 240° C. to obtain a molded article having a thickness of 2 mm for evaluating physical properties.

The resulting molded article was punched or cut into individual predetermined shapes, and physical properties of the resulting molded article were measured according to the above methods.

Example 25

A molded article was prepared and evaluated in a similar manner to Example 24 with the exception that, after the conversion into the acid anhydride type block copolymer (M-7') in a similar manner to Example 24, Daiamide E47-S1 (manufactured by Daicel-Huels Ltd.) was added and the mixture was kneaded in a plastomill at a set temperature of 190° C. and a revolution number of 100 times/minute for 20 minutes and molded on a hot press at a set temperature of 190° C.

Example 26

A molded article was prepared and evaluated in a similar manner to Example 24 with the exception that, after the conversion into the acid anhydride type block copolymer (M-7') in a similar manner to Example 24, 100 parts by weight of UBE STA 3012U (manufactured by Ube Industries, Ltd.) was added.

The evaluation results are shown in Table 6.

TABLE 6

| | Blend content | | | | | Processing Temperature °C. | Hardness JIS A Immediately after | Hardness JIS D Immediately after |
|---|---|---|---|---|---|---|---|---|
| | Resin 1 | part | Resin 2 | part | Resin 3 part | | | |
| Example 24 | M-7' | 100 | PBT | 100 | | 240 | 74 | |
| Example 25 | M-7' | 100 | Daiamide | 100 | | 240→190 | 61 | |
| Example 26 | M-7' | 100 | UBESTA 3012U | 100 | | 240→190 | 79 | |

| | Tensile properties | | Oil resistance 150° C. 72 hr | | Compression set | | Flow property | |
|---|---|---|---|---|---|---|---|---|
| | Strength at break MPa | Elongation at break % | Weight increase % | Shape | 70° C. 22 h % | 100° C. 22 h % | Start of flow ° C. | Finish of flow ° C. |
| Example 24 | 6.1 | 52 | 43.8 | partially dissolved | — | | 134.8 | 189.7 |
| Example 25 | 3.2 | 71 | 72.5 | swollen | — | | 124.3 | 153.6 |
| Example 26 | 2.7 | 14 | 29.3 | slightly swollen | — | | 161.1 | 179 |

Thus, it was found that flexible molded articles having desired tensile properties were obtained. In Examples 24 and 25, based on the measurement of an acetone-insoluble matter, the resin seems to have reacted with the anhydride block copolymer. Moreover, these compositions are suitably usable as compatibility enhancers.

Example 27

A mixture of 100 parts by weight of the MMA-(BA-co-HEA)-MMA block copolymer containing a hydroxyl group in the soft segment and 20 parts by weight of a crystalline thermoplastic resin, a polybutylene terephthalate resin (Duranex 2002, manufactured by Polyplastics Co., Ltd.) was kneaded in a plastomill at a set temperature of 240° C. and a revolution number of 100 times/minute for 3 minutes. Then, 0.00107 part by weight of titanium tetrabutoxide monomer was added thereto as an ester-exchanging catalyst and the whole was kneaded for 7 minutes to obtain a clumpy sample. The resulting sample was molded on a hot press at a set temperature of 240° C. to obtain a sheet having a thickness of 2 mm and a molded article of a right cylindrical shape having a diameter of 30 mm and a height of 12 mm for evaluating physical properties. Evaluation was preformed in a similar manner to Example 1.

Comparative Example 6

A Molded article was prepared and evaluated in a similar manner to Example 27 with the exception that a block copolymer containing no hydroxyl group was used in Example 27.

The evaluation results are shown in Table 7.

TABLE 7

| | Blend content | | | | | | Processing Temperature °C. | Hardness JIS A Immediately after | Hardness JIS D Immediately after |
|---|---|---|---|---|---|---|---|---|---|
| | Resin 1 | part | Resin 2 | part | Resin 3 | part | | | |
| Example 27 | M-4 | 100 | PBT | 20 | Ti(OBu)4 | 1.07E−03 | 240 | 63 | — |
| Comparative Example 6 | M-1 | 100 | PBT | 20 | Ti(OBu)4 | 1.07E−03 | 240 | 52 | |

| | Tensile properties | | Oil resistance 150° C. 72 hr | Compression set | | Flow property | |
|---|---|---|---|---|---|---|---|
| | Strength at break | Elongation at break | Weight increase | 70° C. 22 h | 100° C. 22 h | Start of | Finish of |

TABLE 7-continued

|  | MPa | % | % | Shape | % | % | flow ° C. | flow ° C. |
| --- | --- | --- | --- | --- | --- | --- | --- | --- |
| Example 27 | 4.8 | 78 | 27.1 | maintained | 38.1 | — | 215.5 | 235.6 |
| Comparative Example 6 | 7.2 | 173 | 81.8 | swollen | 45.9 | — | 140 | 192.4 |

From Example 27 and Comparative Example 6, it is understood that the composition of the invention exhibits an elastomer-like properties with maintaining hardness and also exhibits satisfactory compression set, thermal resistance, and oil resistance.

Example 28

A mixture of 100 parts of a poly(vinyl chloride) (KANEVINYL S1007, manufactured by Kanegafuchi Chemical Industries, Co., Ltd.), 1.5 parts of the epoxy group-containing MMA-BA-MMA type block copolymer (M-2)(a processability improver), 2.0 parts of an octyltin mercapto-based stabilizer (TVS #8831, manufactured by Nitto Kasei Co., Ltd.), 1.0 part of a lubricant (Kalcol 8668, manufactured by Kao Corporation), and 3.0 parts of DOP was kneaded using a 6-inch roll of 190° C. The exfoliating property from the roll surface was compared after 10 minutes.

Three-points method was adopted for the evaluation and based on the following criteria, 3 was a highest level of exfoliating property and 1 was a lowest level.

3: The period of time during which a state that the sheet is exfoliative from the roll surface is maintained is not shorter than 3 minutes.

2: The period of time during which a state that the sheet is exfoliative from the roll surface is maintained is not shorter than 2 minutes and not longer than 3 minutes.

1: The period of time during which a state that the sheet is exfoliative from the roll surface is maintained is not longer than 2 minutes.

The exfoliating property was scored 3 points.

Comparative Example 7

When evaluation was performed in a similar manner to Example 28 with the exception that no processing aid was added, the exfoliating property was scored 1 point.

Comparative Example 8

When evaluation was performed in a similar manner to Example 28 with the exception that the MMA-BA-MMA type block copolymer (M-1) was used as a processing aid, the exfoliating property was scored 2 points.

Comparative Example 9

When evaluation was performed in a similar manner to Example 28 with the exception that PA-100 (manufactured by Kanegafuchi Chemical Industries, Co., Ltd.) was used as a processing aid, the exfoliating property was scored 2 points.

From Example 28 and Comparative Examples 7, 8, and 9, it is understood that the epoxy-containing MMA-BA-MMA type block copolymer (M-2) exhibits an effect as a processing aid for a vinyl chloride resin and the effect is larger than the effects of the MMA-BA-MMA type block copolymer and a commercial processing aid.

Example 29

A mixture obtained by blending 84 parts by weight of a methacrylic resin, Parapet G100 (manufactured by KURARAY Co., Ltd.) as a crystalline thermoplastic resin and 16 parts by weight of the epoxy-containing MMA-BA-MMA type block copolymer (M-2) as an impact improver was kneaded in a plastomill at a set temperature of 230° C. and a revolution number of 100 times/minute for 5 minutes to obtain a clumpy sample.

The resulting sample was molded on a hot press at a set temperature of 230° C. to obtain a molded article having a thickness of 2 mm for evaluating physical properties.

The resulting molded article was punched or cut into individual predetermined shapes, and transparency and dispersibility thereof were measured according to the following methods.

(Transparency)

Transparency was visually judged and was evaluated such a manner that the transparency of molded article of the methacrylic resin alone was scored 5 points and complete opacity was scored 0 point.

(Dispersibility)

By means of a transmission electron microscope, a dispersed particle system of the block copolymer was measured.

The transparency was scored 4 points and the dispersion diameter was 100 nm or less, so that the composition had a satisfactory properties.

Comparative Example 10

When a molded article was prepared and evaluated in a similar manner to Example 29 with the exception that the MMA-BA-MMA type block copolymer (M-1) was used, the transparency was scored 3 points and the dispersion diameter was about 200 nm, so that the composition was inferior to that of Example 29.

From Example 29 and Comparative Example 10, in a methacrylic resin, it is understood that the epoxy group-containing MMA-BA-MMA type block copolymer exhibits an effect that the molded article becomes close to transparent owing to the improved dispersibility, as compared with the MMA-BA-MMA type block copolymer. Therefore, in the case of the use as a modifier, impact resistance can be imparted without deteriorating the transparency of a methacrylic resin as far as possible.

Example 30

With 100 parts by weight of a polycarbonate resin Lexan 141R-111 (manufactured by Nippon GE Plastics Co., Ltd.) as a thermoplastic resin, 0.3 part by weight of Topanol CA (manufactured by Lipre Co., Ltd.), and Adekastab PEP-36 (available from Asahi Denka Kogyo K. K.) as stabilizers was blended 10 parts by weight of the epoxy group-containing MMA-BA-MMA type block copolymer (M-2) as an impact improver, and the mixture was extruded with kneading and pelletized at a set temperature of 240° C. by a twin-screw extruder equipped with a vent (32 mm, L/D=25.5). The resulting pellets were dried at 80° C. for 15 hours. When spiral flow which is an index of molding flowability is measured according to the following method, it was found to be 705 mm. Moreover, upon the observation of the resulting molded article, any defect on molding, such as inner exfoliation or burning, was not observed.

(Spiral Flow)

A square spiral having a size of 10 mm×3 mm thickness was injection molded under an injection pressure of 1500 kgf/cm$^2$ and an injection pressure of 50 mm/min with setting a cylinder temperature of 280° C. and a mold temperature of 40° C., and the molding flowability was evaluated by its length (mm).

Comparative Example 11

A molded article was prepared in a similar manner to Example 30 with the exception that no impact improver was added. The spiral flow was found to be 443 mm. Moreover, no defect on molding was observed.

Comparative Example 12

A molded article was prepared in a similar manner to Example 30 with the exception that an acrylonitrile-styrene copolymer resin (manufactured by Kanegafuchi Chemical Industries, Co., Ltd., F85000H, acrylonitrile/styrene=29/71 (weight ratio)) was used as an impact improver. The spiral flow was found to be 575 mm. Moreover, no defect on molding was observed.

Comparative Example 13

A molded article was prepared in a similar manner to Example 3-30 with the exception that the MMA-BA-MMA type block copolymer (M-1) was used as an impact improver. The spiral flow was found to be 855 mm. However, sever inner exfoliation in the molded article and burning of the resin were observed.

From Example 30 and Comparative Examples 11, 12, and 13, it is understood that the epoxy group-containing MMA-BA-MMA type block copolymer exhibits an improving effect in processability without deteriorating moldability and the effect is larger than the effects of the MMA-BA-MMA type block copolymer and the acrylonitrile-styrene copolymer resin.

Example 31

With 90 parts by weight of a polybutylene terephthalate resin (Duranex 2002, manufactured by Polyplastics Co., Ltd.) as a thermoplastic resin was blended 10 parts by weight of the epoxy group-containing MMA-BA-MMA type block copolymer (M-2') having Mn of 100,800, Mw/Mn of 1.46, and a composition of BA/MMA/GMA=73/26/1 (% by weight) as an impact improver, and the mixture was extruded with kneading and pelletized at a set temperature of 240° C. by a twin-screw extruder equipped with a vent (32 mm, L/D=25.5). The resulting pellets were dried at 80° C. for 15 hours and then injection molded at a set temperature of 240° C. and with a mold of 50° C. to obtain a molded article (¼ inch thickness) for evaluating physical properties.

When the Izot impact strength of the resulting molded article was measured at 23° C., the strength was found to be 12 kg-cm/cm. Moreover, when melt viscosity which is an index of molding flowability was measured according to the following method, the viscosity was found to be 2800 poises.

(Melt Viscosity)

In accordance with the method described in JIS K-7199, melt viscosity was measured with a shear rate of 1216 s$^{-1}$ using a capillary rheometer.

Comparative Example 14

A molded article was prepared in a similar manner to Example 31 with the exception that an EXL2330 (a core-shell type polymer modifier, Rohm and Haas Co., Ltd.) was used as an impact improver. When the Izot impact strength was evaluated at 23° C., the strength was found to be 8 kg-cm/cm. Moreover, the melt viscosity was found to be 2500 poises.

Comparative Example 15

A molded article was prepared in a similar manner to Example 31 with the exception that the MMA-BA-MMA type block copolymer (M-1) was used as an impact improver. When the Izot impact strength was evaluated at 23° C., the strength was found to be 9 kg-cm/cm. Moreover, the melt viscosity was found to be 1500 poises.

From Example 31 and Comparative Examples 14 and 15, it is understood that an epoxy group-containing MMA-BA-MMA type block copolymer is superior in impact resistance-improving effect and molding flowability-improving effect of a polybutylene terephthalate resin as compared with a core-shell type polymer modifier. Also, it is understood that a balance between the impact resistance-improving effect and molding flowability-improving effect can be controlled, since the melt viscosity of the polybutylene terephthalate resin can be controlled by the content of an epoxy group.

(2) Examples (2-1) to (2-3) and Comparative Example 2-1 Example 2-1

With 75 parts by weight of a recycled PET resin (a flake resin obtained by separating, pulverizing, washing, and drying recycled drink bottles made of polyethylene terephthalate) as a crystalline thermoplastic resin was blended 25 parts by weight of the epoxy-containing MMA-BA-MMA type block copolymer (M-2), and the mixture was kneaded in a plastomill at a set temperature of 280° C. and a revolution number of 50 times/minute for 10 minutes to obtain a clumpy sample.

The resulting sample was pulverized in a pulverizer and the melt viscosity at 280° C. was found to be 1900 poises.

(Melt Viscosity)

In accordance with the method described in JIS K-7199, melt viscosity was measured with a shear rate of 61 s$^{-1}$ using a capillary rheometer.

Example 2-2

Evaluation was preformed in a similar manner to Example 2-1 with the exception that the acid anhydride group-containing block copolymer (M-7) was used as the block copolymer in Example 2-1.

The melt viscosity at 280° C. was found to be 2300 poises.

Example 2-3

Evaluation was preformed in a similar manner to Example 2-1 with the exception that the carboxyl group-containing block copolymer (M-6) was used as the block copolymer in Example 2-1.

The melt viscosity at 280° C. was found to be 500 poises.

Comparative Example 2-1

Evaluation was preformed in a similar manner to Example 2-1 with the exception that no block copolymer was used in Example 2-1. The melt viscosity at 280° C. was found to be 6 poises.

From the results of Examples 2-1, 2-2, and 2-3 and Comparative Example 2-1, it is understood that block copolymers containing an epoxy group, an acid anhydride group, or a carboxyl group have a thickening effect on recycled PET. Of these, block copolymers containing an epoxy group or an acid anhydride group are found to have a more excellent effect.

INDUSTRIAL APPLICABILITY

The thermoplastic resin composition of the invention is capable of providing a molded article exhibiting an excellent physical property balance such as impact resistance, molding flowability, and processability with maintaining properties inherent to thermoplastic resins such as weatherability and thermal stability.

Moreover, the thermoplastic resin composition of the invention is capable of providing a molded article usable as an elastomer excellent in physical property balance. More specifically, it is capable of providing a molded article exhibiting an excellent physical property balance such as hardness, elastomer property, and processability with well maintaining properties inherent to thermoplastic resins such as thermal stability and oil resistance.

Accordingly, the thermoplastic resin composition of the invention can be suitably used for producing various molded articles such as extrudate including sheets, films, plates and profiles, calender molded articles, blow molded articles including bottles and the like, and various injection molded articles for use in automobiles or household electrical goods useful as packaging materials, materials for construction and civil engineering, materials for automobiles, materials for home electric appliances and materials for other general goods, and hence the composition is of great industrial value.

The invention claimed is:

1. A thermoplastic composition comprising:
a thermoplastic resin and a block copolymer;
wherein said block copolymer comprises a methacrylic polymer block and an acrylic polymer block, at least one of said methacrylic polymer block and said acrylic polymer block comprising a reactive functional group selected from the group consisting of an epoxy group, a hydroxyl group, and a carboxyl group;
wherein the number of the reactive functional group is 0.1 or more per molecule of the block polymer which contains it;
wherein the thermoplastic resin is selected from the group consisting of crystalline polyester resins and crystalline polyamide resins, and wherein the thermoplastic resin composition comprises 50 to 10% by weight of the thermoplastic resin and 50 to 90% by weight of the block copolymer.

2. A thermoplastic composition comprising:
a thermoplastic resin and a block copolymer;
wherein said block copolymer comprises a methacrylic polymer block and an acrylic polymer block, at least one of said methacrylic polymer block and said acrylic polymer block comprising a reactive functional group selected from the group consisting of an epoxy group;
wherein the number of the reactive functional group is 0.1 or more per molecule of the block polymer which contains it;
wherein the acrylic polymer block contains an epoxy group, wherein the thermoplastic resin is selected from the group consisting of crystalline polyester resins, poly(vinyl chloride) resins, and polycarbonate resins, and wherein the thermoplastic resin composition comprises 99.5 to 50% by weight of the thermoplastic resin and 0.5 to 50% by weight of the block copolymer.

3. The thermoplastic resin composition according to any one of claims 1, and 2, wherein the block copolymer is produced by a controlled radical polymerization.

* * * * *